United States Patent [19]
Fujisaki et al.

[11] Patent Number: 5,747,833
[45] Date of Patent: May 5, 1998

[54] APPARATUS FOR DRIVING INDUCTION MOTOR

[75] Inventors: Yoshihiro Fujisaki, Matsubara; Shinichi Emura, Neyagawa; Kazuyuki Takada, Hirakata, all of Japan

[73] Assignee: Matsushita Electric Industrial Co., Ltd., Osaka, Japan

[21] Appl. No.: 654,707

[22] Filed: May 29, 1996

[30] Foreign Application Priority Data

Aug. 28, 1995 [JP] Japan .................. 7-218539

[51] Int. Cl.$^6$ ...................... H02P 5/28
[52] U.S. Cl. .................. 318/808; 318/802; 318/805
[58] Field of Search ................ 318/808, 802, 318/807, 809, 759, 758, 798, 767, 810, 805, 812; 388/809, 815, 806

[56] References Cited

U.S. PATENT DOCUMENTS

| | | | |
|---|---|---|---|
| 3,916,275 | 10/1975 | Plunkett et al. | 318/808 |
| 4,243,927 | 1/1981 | D'atre | 318/803 |
| 4,455,522 | 6/1984 | Lipo | 318/809 |
| 4,683,412 | 7/1987 | Bialek et al. | 318/798 |
| 4,777,420 | 10/1988 | Dadpey et al. | 318/759 |
| 5,272,429 | 12/1993 | Lipo et al. | 318/808 |

FOREIGN PATENT DOCUMENTS 63-140688  6/1988  Japan.

*Primary Examiner*—John W. Cabeca
*Attorney, Agent, or Firm*—Watson Cole Stevens Davis, P.L.L.C.

[57] ABSTRACT

A driving apparatus of an induction motor applied for drive of a fan of an air conditioner has a voltage limiter unit for limiting an upper limit of an output voltage of an inverter circuit, a voltage slow-up unit for converting an output signal of an output voltage commanding unit into a signal which increases gradually when that output signal rises, a voltage slow-down unit for converting the output signal of the output voltage commanding unit into a signal which decreases gradually when that output signal falls, and a feed interruption processing unit for setting the output signal value of the output voltage commanding unit to 0 when interrupting feeding and delivering a feed interruption signal at the termination of the lapse of a predetermined time.

5 Claims, 18 Drawing Sheets

F I G. 10
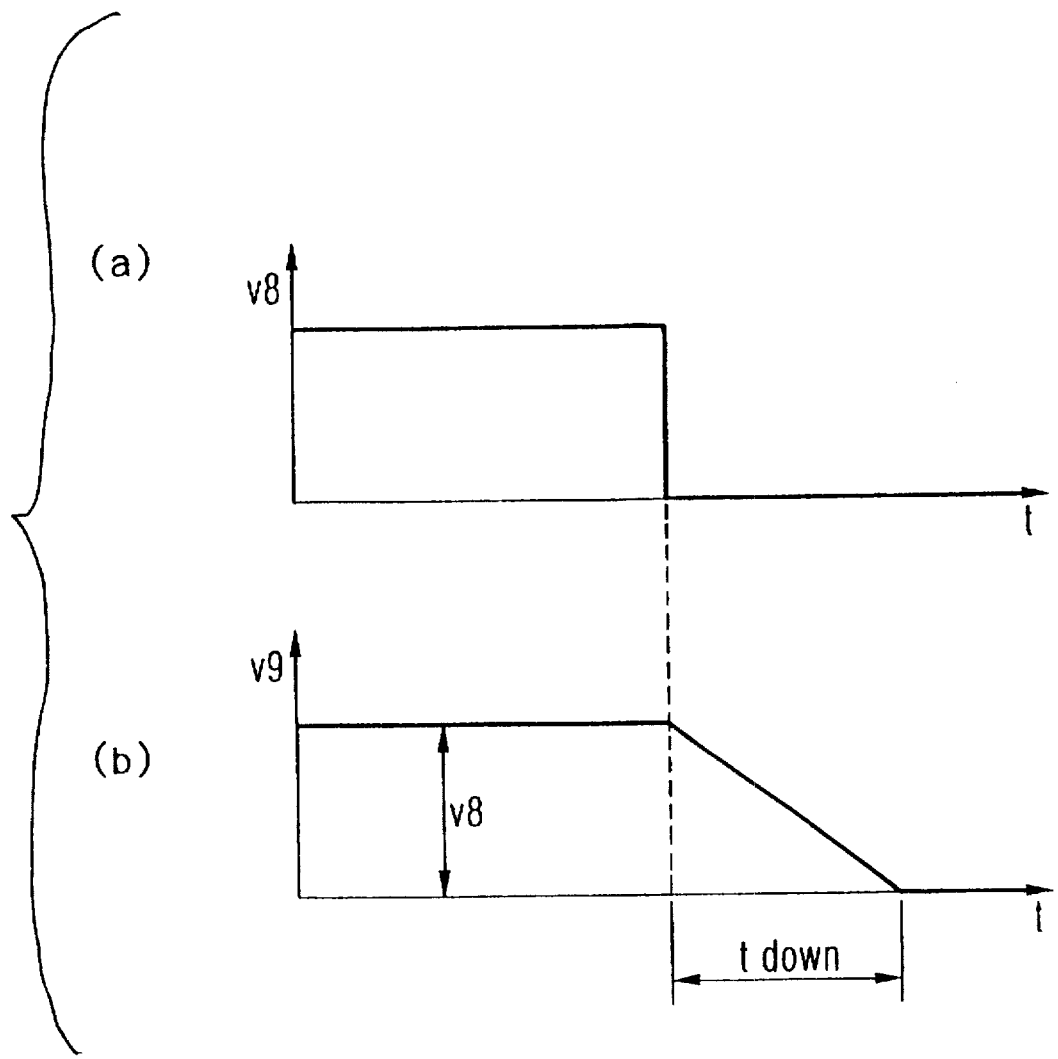

APPARATUS FOR DRIVING INDUCTION MOTOR

BACKGROUND OF THE INVENTION

The present invention relates to an apparatus for driving an induction motor when the induction motor is used as a fan motor to drive, for example, an outdoor blast fan of an air conditioner.

In recent years, a technique has been widely utilized in which an induction motor is used as a blast fan motor of an air conditioner, an inverter circuit based on pulse width modulation (hereinafter simply referred to as PWM) is used as a control circuit for the induction motor, and the induction motor is driven by changing voltage and frequency so that the rotation number may be controlled desirably.

A conventional induction motor driving apparatus will be described below.

FIG. 20 is a block diagram showing the conventional induction motor driving apparatus. As shown in FIG. 20, the driving apparatus includes a three-phase induction motor 1001 connected with a fan 1002, an inverter circuit 1003 for feeding a three-phase AC voltage to the induction motor 1001 on the basis of an output voltage command signal v and an output frequency command signal f, an AC power supply 1006, a rectifier circuit 1007 and a smoothing capacitor 1008 for rectifying and smoothing the output of the AC power supply 1006 and applying a DC voltage to the inverter circuit 1003, an output voltage commanding unit 1004 for applying the output voltage command signal v to the inverter circuit 1003, and a voltage/frequency converting unit 1005 for definitely determining the output frequency command signal f in accordance with a voltage command signal delivered out of the output voltage commanding unit 1004 and applying the determined signal to the inverter circuit 1003, whereby the three-phase induction motor 1001 is driven by changing voltage and frequency in accordance with the voltage command signal v of the output voltage commanding unit 1004 and the frequency command signal f definitely determined by means of the voltage/frequency converting unit 1005 in compliance with the voltage command signal v.

The technique as above is called VVVF control and generally well known as a method for variable speed drive of an induction motor.

The above conventional construction, however, have many disadvantages as will be described below.

Firstly, when the fan 1002 is externally forcibly driven by, for example, a natural wind, especially, a storm, a problem takes place.

For example, when a wind (counter wind) which drives the fan 1002 in a direction opposite to the direction of drive of the induction motor 1001 is generated, load torque acting on the induction motor 1001 is increased to increase drive current. If the increased drive current exceeds allowable current values of the induction motor 1001 and the inverter circuit 1003 for feeding the same, then they will be brought into breakdown.

When a wind (tail wind) which drives the fan 1002 in the same direction as the direction of drive of the induction motor 1001 is generated, the induction motor 1001 is forcibly accelerated and the rotation speed exceeds a value corresponding to the output frequency delivered out of the inverter circuit 1003, that is, a synchronous speed, the induction motor operates as a generator to generate regenerative power.

The regenerative power generated from the induction motor 1001 is returned to the inverter circuit 1003 and as a result, terminal voltage of the smoothing capacitor 1008 is boosted. With the terminal voltage of the smoothing capacitor 1008 raised, the smoothing capacitor 1008 and inverter circuit 1003 are placed in overvoltage condition and their breakdown results.

As measures to prevent the overvoltage breakdown, a regenerative power processing apparatus is conceivable which absorbs regenerative power of the induction motor 1001 to suppress the increase of the voltage but such an apparatus requires parts durable to large power and has a disadvantage that the apparatus is inevitably increased in size and cost.

Next, in the event that any foreign matter tangles with the induction motor 1001 or the fan 1002, the drive current increases as in the case of the aforementioned action of counter wind and this state continues even with a current value at that time not exceeding an allowable current value in contrast to the case of the wind, so that the temperature rises and the thus generated heat sometimes brings the induction motor 1001 and inverter circuit 1003 into breakdown.

Further, with the output signal of the output voltage commanding unit 1004 fixed, the output characteristic of the induction motor 1001 remains unchanged and therefore, when a wind acts and the load torque changes, the rotation speed of the induction motor is of course changed. This disadvantage is of matter in an application in which constancy of speed is required.

SUMMARY OF THE INVENTION

The present invention contemplates elimination of the above problems and it is an object of the present invention to provide a driving apparatus of an induction motor which, even when a strong counter or trail wind is generated by a storm, can prevent an overcurrent or an overvoltage due to generation of regenerative power, can protect the induction motor from overheating in the event that an overload acts continually and can keep the rotation speed constant even when load torque varies.

Firstly, according to the present invention, to accomplish the above object, in a driving apparatus of an induction motor driven under slip frequency control including speed detecting means for detecting a rotation speed of the induction motor, an inverter circuit for feeding an AC voltage to the induction motor on the basis of an output voltage command signal and an output frequency command signal, output voltage commanding means for applying the output voltage command signal to the inverter circuit, and output frequency commanding means for applying to the inverter circuit the output frequency command signal in the form of a frequency signal obtained by adding a predetermined slip frequency to a frequency signal delivered out of the speed detecting means and conforming to the rotation speed of the induction motor, there are provided voltage limit level setting means for setting an upper limit value of the output voltage of the inverter circuit in accordance with the output signal of the output frequency commanding means or the output signal of the speed detecting means, voltage limiter means for restricting the upper limit of the output voltage of the inverter circuit by restricting the output signal of the output voltage commanding means on the basis of a set value of the voltage limit level setting means, and voltage slow-up means for converting the output signal of the output voltage commanding means into a signal which increases at gradual slope with the lapse of time when that output signal rises and which serves as the output voltage command signal inputted to the inverter circuit.

Secondly, voltage slow-down means is provided for converting the output signal of the output voltage commanding means into a signal which decreases at a gradual slope with the lapse of time when that output signal falls and which serves as the output voltage command signal inputted to the inverter circuit.

Thirdly, there are provided feed interruption commanding means which delivers a command signal for interrupting feeding to the induction motor, and feed interruption processing means which sets the output signal value of the output voltage commanding means to 0 when the output signal of the feed interruption commanding means changes from a signal level for commanding feeding to a signal level for commanding feed interruption and which delivers a first feed interruption signal at the termination of the lapse of a predetermined time, whereby when the feed interruption processing means delivers the first feed interruption signal, feeding to the induction motor is interrupted.

Fourthly, there are provided reference load timed voltage level setting means for setting an output voltage value of the inverter circuit which prevails when a reference load is applied to the induction motor in accordance with the output signal of the output frequency commanding means or the output signal of the speed detecting means, load level detecting means for estimating a present load level through calculation based on a ratio of a present output voltage value of the inverter circuit to the set value of the reference load timed voltage level setting means, a low-pass filter for removing high frequency components of the output signal of the load level detecting means, and overload detecting means for comparing the output signal of the low-pass filter with a preset allowable maximum load level and delivering a second feed interruption signal when that output signal is larger than the allowable maximum load level, whereby when the overload detecting means delivers the second feed interruption signal, feeding to the induction motor is interrupted.

Fifthly, there are provided speed commanding means for delivering a rotation speed command signal for the induction motor, speed difference calculating means for delivering a speed difference signal obtained by subtracting the rotation speed signal delivered out of the speed detecting means from the rotation speed command signal delivered out of the speed commanding means, and speed difference amplifying means for amplifying and processing the speed difference signal delivered out of the speed difference calculating means in the proportional mode, integral mode, differential mode or proportional, integral and differential combined mode and applying a resulting signal to the output voltage commanding means.

With this construction, even when a strong counter or trail wind is generated by, for example, a storm, the set level of the upper limit value of the output voltage of the inverter circuit can be changed increasingly or decreasingly in compliance with an increasing or decreasing change of the output frequency of the inverter circuit and besides the slip frequency can be kept to be a positive value, thereby ensuring that generation of an overcurrent and regenerative power can be prevented.

Also, the present load level is estimated from the ratio between the output voltage value of the inverter circuit when the reference load is applied to the induction motor and the present output voltage value and when the estimated load level remains to be excessive for a long time, the feed interruption processing is carried out, thus preventing thermal breakdown due to an overload.

Further, a difference between a target rotation speed and a present rotation speed is calculated and the output voltage command value is applied to make the difference zero, thus keeping the rotation speed constant even when the load torque varies.

In this manner, a driving apparatus of an induction motor suitable for drive of a fan of an air conditioner can be realized.

BRIEF DESCRIPTION OF THE DRAWINGS

FIG. 10 shows time charts (a) and (b) for explaining the operation of a voltage slow-down unit in the second embodiment of the invention.

DESCRIPTION OF THE PREFERRED EMBODIMENTS (Embodiment 1)

A first embodiment of the present invention will now be described with reference to the accompanying drawings.

Figure 1:
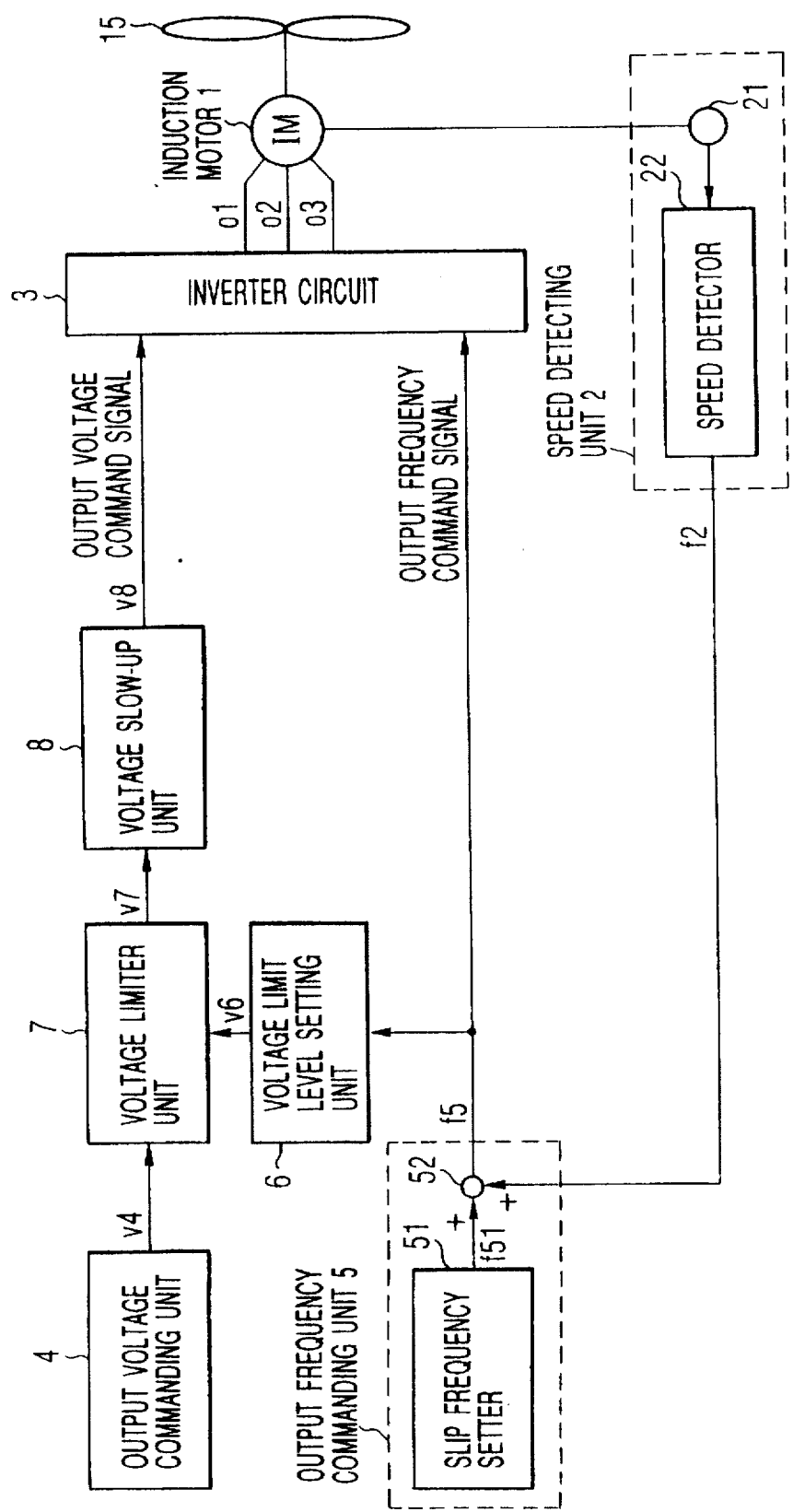
FIG. 1 is a block diagram showing a driving apparatus of an induction motor according to a first embodiment of the present invention.

FIG. 1 shows a driving apparatus of an induction motor according to the first embodiment of the present invention. Referring to FIG. 1, an induction motor 1 has an output shaft connected directly with a fan 15, and a speed detecting unit 2 is comprised of a rotation speed sensor 21 for detecting a rotation speed of the induction motor 1 and a speed detector 22 for processing an output signal of the rotation speed sensor to deliver a frequency signal f2 proportional to the rotation speed of the induction motor 1. An inverter circuit 3 performs power conversion of a DC voltage resulting from rectification and smoothing of, for example, a commercial AC voltage not shown into a three-phase AC voltage of phases o1, o2 and o3 based on an output voltage command signal v8 and an output frequency command signal f5, so that the three-phase AC voltage is fed to the induction motor 1. The three phases o1, o2 and o3 of the three-phase AC voltage are 120° electrically dephased from each other, and the three-phase AC voltage has an output voltage peak value corresponding to the output voltage command signal v8 and an output frequency corresponding to the output frequency command signal f5.

An output frequency commanding unit 5 is comprised of a slip frequency setter 51 and an adder 52 for adding an output signal f51 of the slip frequency setter 51 and the output signal f2 of the speed detecting unit 2 and a sum output of the adder 52 is delivered as the output signal f5.

The output signal f5 of the output frequency commanding unit 5 is applied to the inverter circuit 3 and a voltage limit level setting unit 6.

The voltage limit level setting unit 6 can change its output signal v6 in accordance with its input signal f5 in such a manner that the output signal v6 decreases as the input signal f5 decreases and conversely the output signal v6 increases as the input signal f5 increases. This output signal v6 is applied to a voltage limiter unit 7 to serve as a voltage limit value setting signal.

An output voltage commanding unit 4 delivers an output signal v4 to the voltage limiter unit 7 in order that the output signal v4 has its upper limit restricted by the voltage limiter unit 7 which in turn delivers an output signal v7 to a voltage slow-up unit 8.

More particularly, when the input signal v4 is below the input signal v6, the voltage limiter unit 7 makes the output signal v7 identical to the input signal v4 and when the input signal v4 exceeds the input signal v6, it makes the output signal v7 identical to the input signal v6.

When the input signal v7 rises, the voltage slow-up unit 8 gradually increases its output signal v8 up to a signal level of the input signal v7 with the lapse of time and the rate of increasing is preset. The output signal v8 is fed to the inverter circuit 3 to serve as an output voltage command signal.

The operation of the driving apparatus constructed as above will be described.

Figure 2:
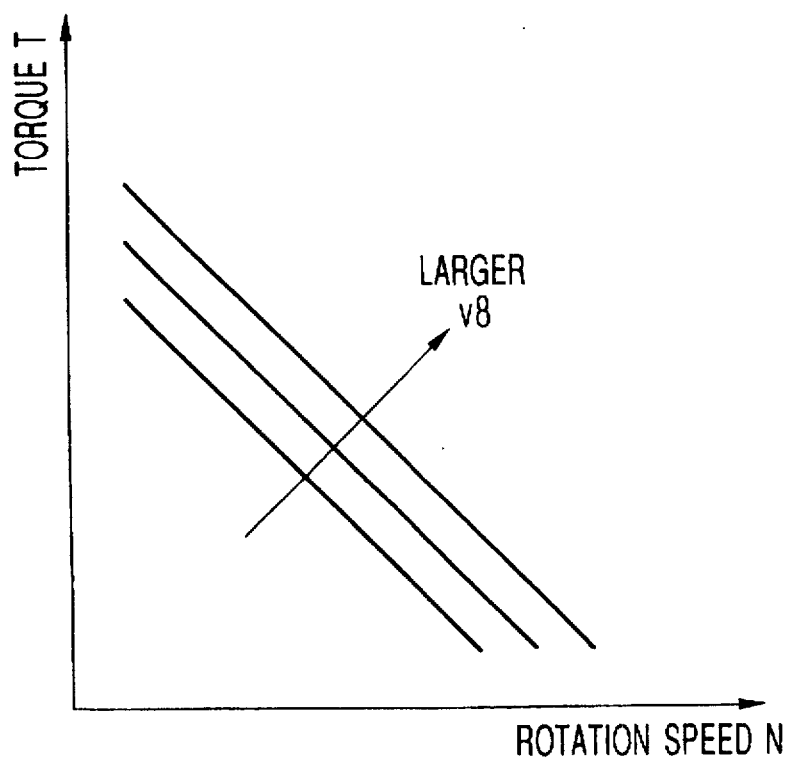
FIG. 2 is a graph showing an N-T characteristic of an induction motor under slip frequency control in the first embodiment of the invention.

As shown in FIG. 1, a frequency signal f5 obtained by adding a predetermined slip frequency signal f51 delivered out of the slip frequency setter 51 to a frequency signal f2 complying with a rotation speed of induction motor 1 delivered out of the speed detecting unit 2 is applied, as an output frequency command signal, to the inverter circuit 3. On the other hand, the induction motor 1 has a rotation speed versus torque characteristic (hereinafter simply referred to as N-T characteristic) resembling that of a DC motor and so the N-T characteristic shifts in accordance with the output voltage command signal v8 as shown in FIG. 2. Very highly efficient driving can be realized by setting the slip frequency signal f51 suitably and besides, since the slip frequency is always controlled to a positive value, the rotation speed of the induction motor 1 does not exceed a synchronous speed and no regenerative power is generated.

When the induction motor 1 driven by controlling the slip frequency in this manner is used as, for example, a drive motor for an outdoor fan of an air conditioner, it operates as will be described below with reference to FIG. 3.

Figure 3:
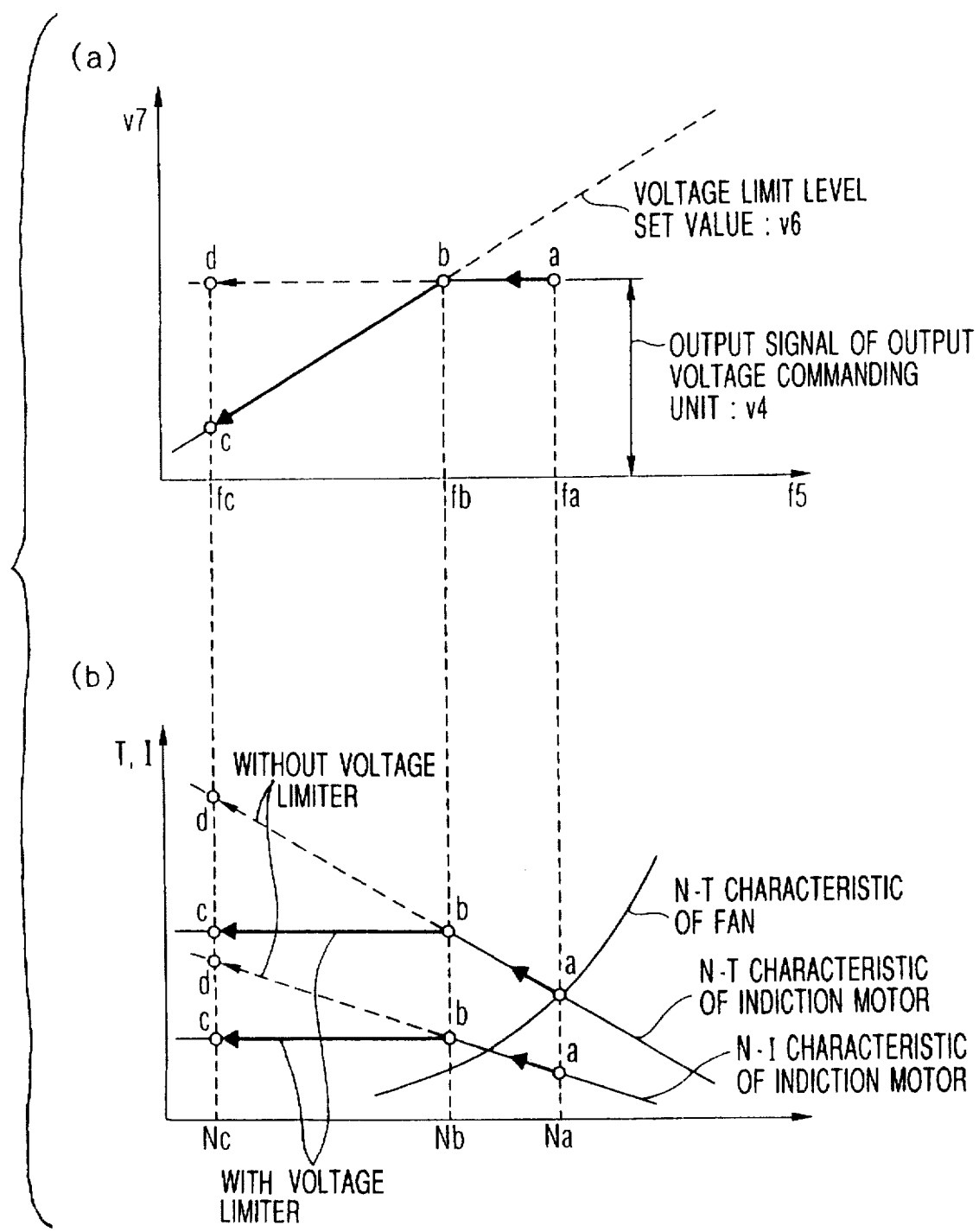
FIG. 3 shows graphs (a) and (b) for explaining the operation in the first embodiment of the invention.

A lower illustration (b) in FIG. 3 shows an N-T characteristic and a rotation speed versus driving current characteristic (hereinafter simply referred to as N-I characteristic) of the induction motor 1, along with an N-T characteristic of the fan 15 standing for a load in the case where the output signal v4 of the output voltage commanding unit 4 is constant.

Fan load increases as the rotation speed increases as shown in the characteristic (a) and (b) of FIG. 3 and when the fan 15 is driven by the induction motor 1, the induction motor 1 is so operated as to stabilize its rotation speed at a point a where output torque of the induction motor 1 balances with load torque of the fan 15.

With the rotation speed stabilized at the point a in this manner, when a strong counter wind opposite to a blast direction blows upon the fan 15 to increase the load torque, the induction motor 1 decreases its rotation speed and increases its driving current in accordance with the N-T and N-I characteristics and eventually, the operating point shifts from the point a to a point b.

If a stronger counter wind blows against the fan 15 after the operating point has shifted to the point b, the rotation speed of the induction motor 1 is further decreased. At that time, if the output signal v4 of the output voltage commanding unit 4 is supplied as it is without being restricted to serve as the output voltage command signal v8 for the inverter circuit 3, the operating point shifts from the point b to a point d, with result that driving current of the induction motor 1 is further increased as the rotation speed decreases.

With the driving current increased, disadvantages similar to those encountered in driving of the induction motor based on VVVF control according to the prior art arise including such events that there is a possibility that the driving current exceeds allowable current values of the induction motor 1 and inverter circuit 3 to lead to their breakdown, that large-sized elements of large power capacity must be used as power semiconductor parts constituting the inverter circuit 3 to prevent the breakage, and that when a so-called trip mode is operated in which an overcurrent is detected to interrupt feeding of the induction motor 1 and keep this interruption state for the purpose of protecting the induction motor from the overcurrent, the induction motor is caused to be stopped so often that a strong wind blows, making it difficult that the induction motor 1 is used as the outdoor fan motor of the air conditioner.

To prevent the occurrence of such inconvenience as above, the voltage limit level setting unit 6 and voltage limiter unit 7 are provided in the present embodiment.

The operation of the voltage limit level setting unit 6 and voltage limiter unit 7 will be described below.

The voltage limit level setting unit 6 operates to deliver to the voltage limiter unit 7 an output signal v6 which is a set signal for setting an upper limit of a voltage peak value of a three-phase AC voltage of phases o1, o2 and o3 standing for an output voltage of the inverter circuit 3.

More specifically, the output signal v6 is changed in accordance with an input signal f5 from the output frequency commanding unit 5 so as to decrease as the input signal f5 decreases and increase as the input signal f5 increases.

The voltage limiter unit 7 operates to restrict an output signal v4 of the output voltage commanding unit 4 on the basis of the output signal v6 of the voltage limit level setting unit 6, thereby eventually restricting the upper limit of the voltage peak value of the three-phase AC voltage of phases o1, o2 and o3 standing for the output voltage of the inverter circuit 3.

More specifically, when the input signal v4 from the output voltage commanding unit 4 is below the input signal v6 from the voltage limit level setting unit 6, the output signal v7 of the voltage limiter unit 7 coincides with the input signal v4, so that the induction motor 1 is driven on the basis of the output signal v4 of the output voltage commanding unit 4. Otherwise, when the input signal v4 from the output voltage commanding unit 4 exceeds the input signal v6 from the voltage limit level setting unit 6, the output signal v7 of the voltage limiter unit 7 coincides with the input signal v6, with the result that the induction motor 1 is driven on the basis of the output signal v6 of the voltage limit level setting unit 6.

In other words, with the input signal v4 exceeding the input signal v6, the output voltage command for the inverter circuit 3 decreases in conformity with a decrease in the output signal f5 of the output frequency commanding unit 5 and the output voltage command for the inverter circuit 3 increases in conformity with an increase in the output signal f5 of the output frequency commanding unit 5.

The operation of the present embodiment having the voltage limit level setting unit 6 and voltage limiter unit 7 which operate as above will now be described with reference to FIG. 3 by taking an instance where a strong counter wind blows upon the fan 15 and load torque imposed on the induction motor 1 increases.

Firstly, at the operating point a shown in FIG. 3, the output signal v4 of the output voltage commanding unit 4 is below the output signal v6 of the voltage limit level setting unit 6 and therefore, the induction motor 1 is driven on the basis of the output signal v4 and the rotation speed is rendered to be stable at Na so that the output torque of the induction motor 1 may balance with the load torque of the fan 15.

When a strong counter wind blows upon the fan 15 at the operating point a, the rotation speed of the induction motor 1 decreases and the operating point reaches point b at which the rotation speed is Nb.

When a stronger counter wind blows, the rotation speed is further decreased to Nc.

With the rotation speed of the induction motor 1 decreased to Nc, the output frequency command signal f5 for the inverter circuit 3 is also decreased to fc responsively to the rotation speed and in conformity therewith, the output signal v6 of the voltage limit level setting unit 6 is decreased.

At that time, the output signal v4 of the output voltage commanding unit 4 exceeds the output signal v6 and so, the output signal v6 of the voltage limit level setting unit 6 is transmitted in the form of an output voltage command for the inverter circuit 3.

Accordingly, the voltage peak value of the three-phase AC voltage of phases o1, o2 and o3 to be fed to the induction motor 1 is suppressed and the increase of the driving current can be suppressed as shown at the operating point c in FIG. 3.

Here, in a region where the induction motor 1 is driven on the basis of the output signal v6 of the voltage limit level setting unit 6, that is, where the rotation speed is lower than that at the operating point b in FIG. 3, the N-T and N-I characteristics of the induction motor 1 can be varied in accordance with the input-output characteristic of the voltage limit level setting unit 6.

Figure 4:
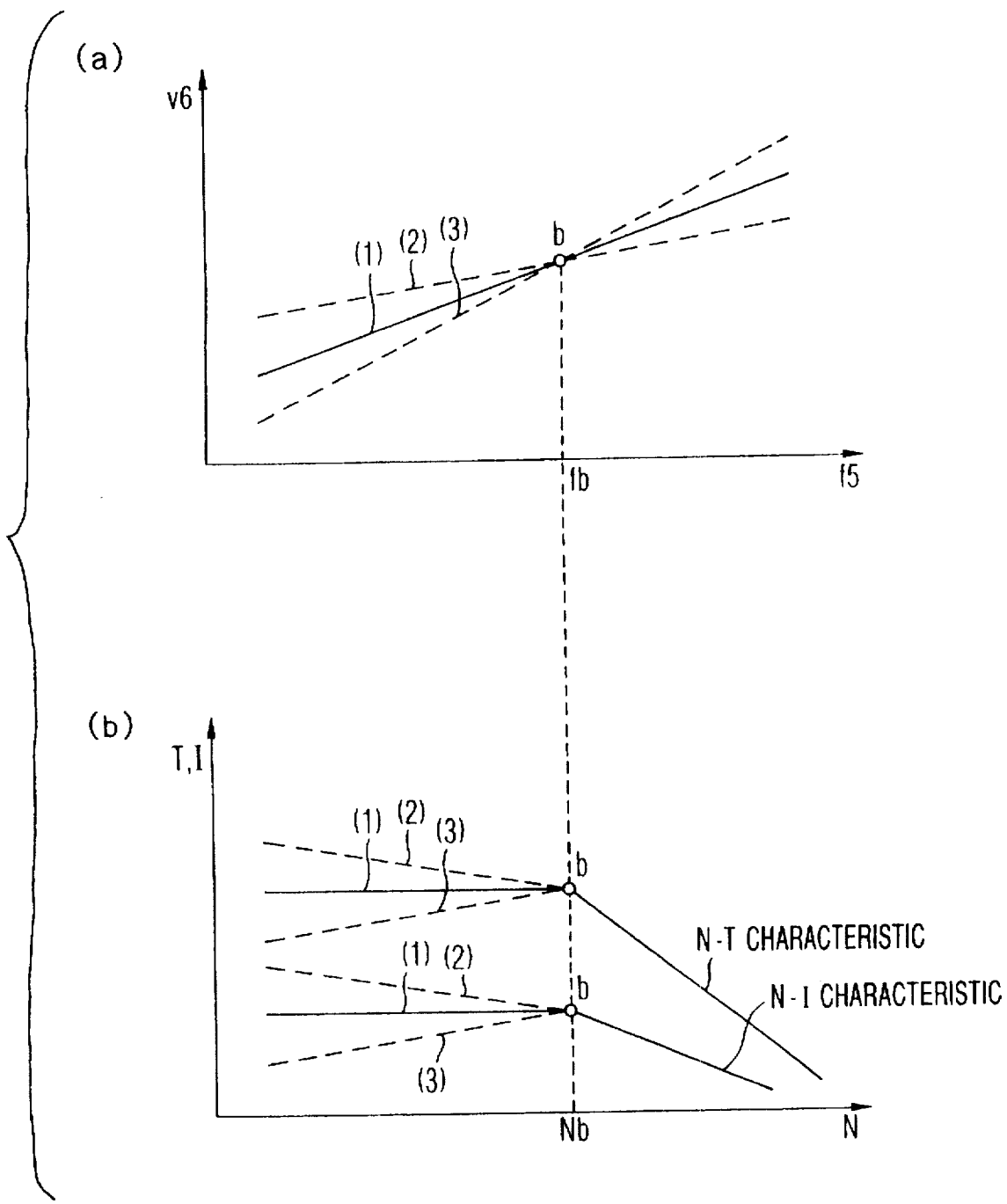
FIG. 4 shows graphs (a) and (b) for explaining the operation in the first embodiment of the invention.

More particularly, by changing the rate of change of the output signal v6 relative to the input signal f5 to the voltage limit level setting unit 6 to (1), (2) and (3) as shown at an upper illustration (a) in FIG. 4, the N-T and N-I characteristics of the induction motor can be changed freely to (1), (2) and (3) as shown at a lower illustration (b) in FIG. 4.

Through this, the characteristics of the induction motor can be adjusted electrically and the same motor can be electrically easily adaptive to various application states.

Obviously, the operating point b in FIG. 3 or 4 can be set desirably by changing, for example, the slope of the input-output characteristic (f5–v6 characteristic) of the voltage limit level setting unit 6.

The input-output characteristic (f5–v6 characteristic) of the voltage limit level setting unit 6 is not always required to be linear as shown in FIG. 3 or 4 but it may be of a desired curve or of a desired straight line or curve having discontinuous points.

Next, the voltage slow-up unit 8 will be described.

Figure 5:
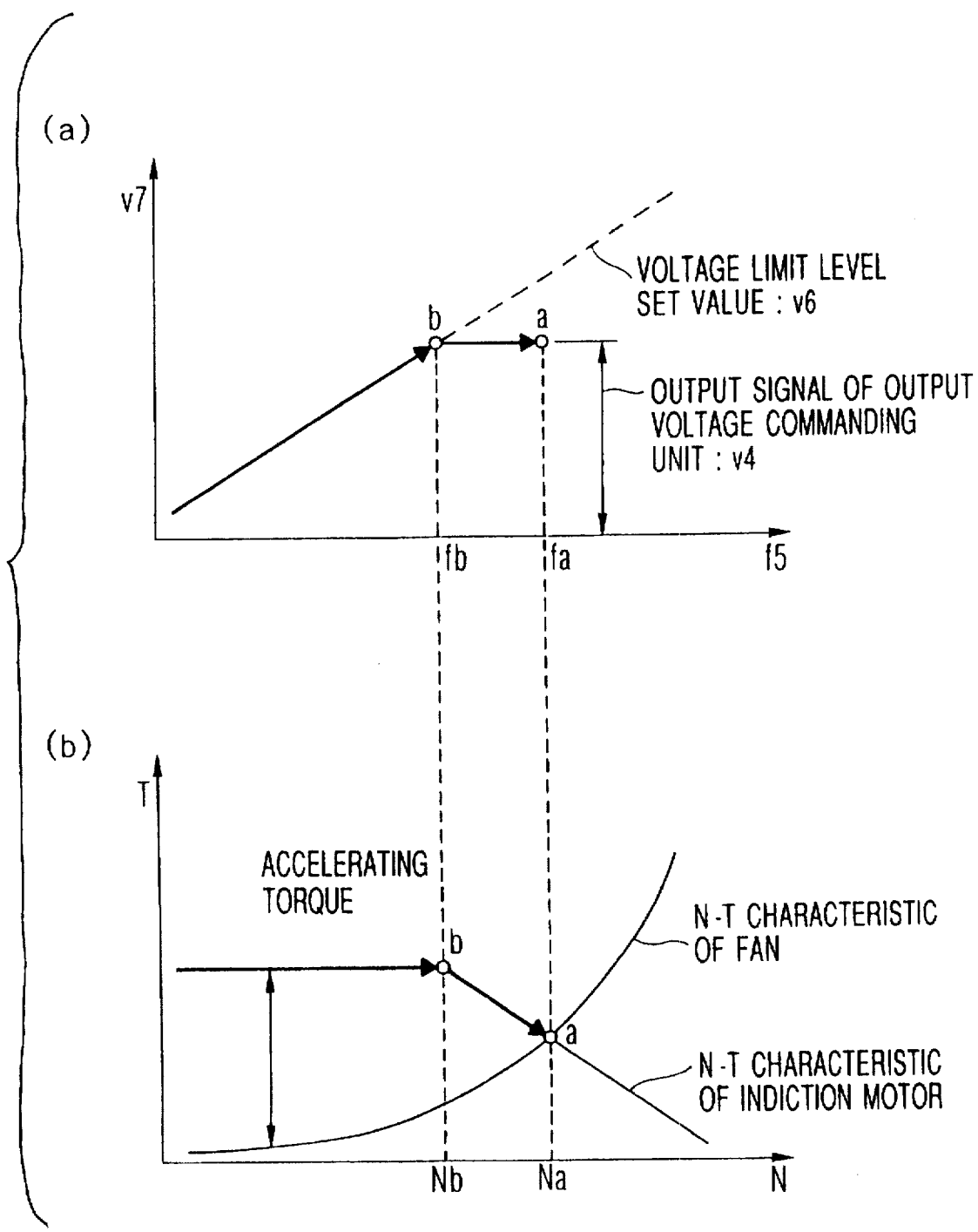
FIG. 5 shows graphs (a) and (b) for explaining the operation in the first embodiment of the invention.

Firstly, without the voltage slow-up unit 8, the induction motor 1 operates to trace a transient state (a), (b) as shown in FIG. 5 in which the induction motor 1 starts from the stop state and reaches the stationary state. When a desired voltage command value is applied to the output voltage commanding unit 4 while the induction motor 1 being placed in stop condition, the output signal v6 of the voltage limit level setting unit 6 is caused to serve as the output voltage command signal for the inverter circuit 3 by the action of the voltage limit level setting unit 6 and voltage limiter unit 7 before the operating point b is reached as described hereinbefore. Then, the output signal v4 of the output voltage commanding unit 4 serves as the output voltage command signal for the inverter circuit 3 while the operating point passes through the point b and reaches the point a.

In this process, since the load torque of the fan 15 is substantially proportional to the square of the rotation speed, torque consumed to accelerate the induction motor 1 (hereinafter referred to as accelerating torque) obtained by subtracting the load torque of the fan 15 from the output torque of the induction motor 1 assumes a relatively large value when the rotation speed is low. The relatively large value of accelerating torque sometimes causes vibration and noise during starting depending on the condition of the mechanical system.

In addition, by reason of resolution of the output signal f5 of the output frequency commanding unit 5, the output signal v6 of the voltage limit level setting unit 6 cannot be allowed to increase continuously as the output signal f5 increases and it sometimes increases stepwise and discontinuously. In this case, vibration and noise sometimes take place as the output signal v6 passes through discontinuous points.

To eliminate the disadvantages as above, the voltage slow-up unit 8 is provided in the present embodiment.

Figure 6:
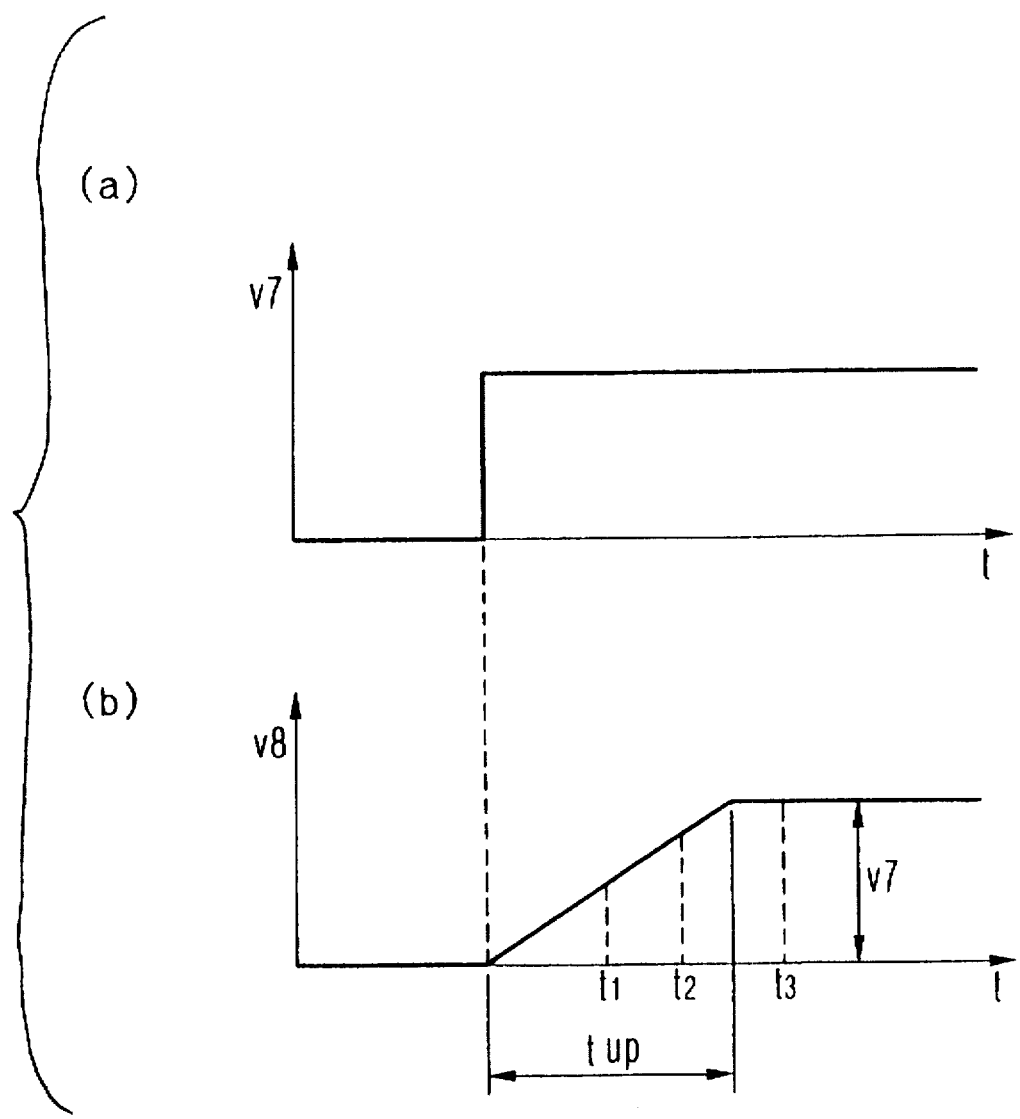
FIG. 6 shows time charts (a) and (b) for explaining the operation of a voltage slow-up unit in the first embodiment of the invention.

FIGS. 6(a) and (b) shows the operation of the voltage slow-up unit 8, depicting how the input signal v7 and the output signal v8 change with time t on abscissa. In operation, as shown in FIG. 6, the voltage slow-up unit 8 receives the output signal v7 of the voltage limiter unit 7 and upon rise of the signal v7, it increases its output signal v8 gradually at a preset rate with the lapse of time to the same level as that of its input signal v7. Rise time tup required for the output signal v8 to reach the same level as that of the input signal v7 takes a value of, for example, several of 100 ms to several of 100 s when voltage changes from 0 (zero) to a maximum voltage level and typically, a value of several of seconds to several of 10 s suffices to solve the aforementioned problems.

In the present embodiment having the voltage slow-up unit 8 which operates as described above, the induction motor 1 operates to trace a transient state in which the induction motor starts from the stop state and reaches the stationary state, as will be described below with reference to FIGS. 7(a) and (b).

Figure 7:
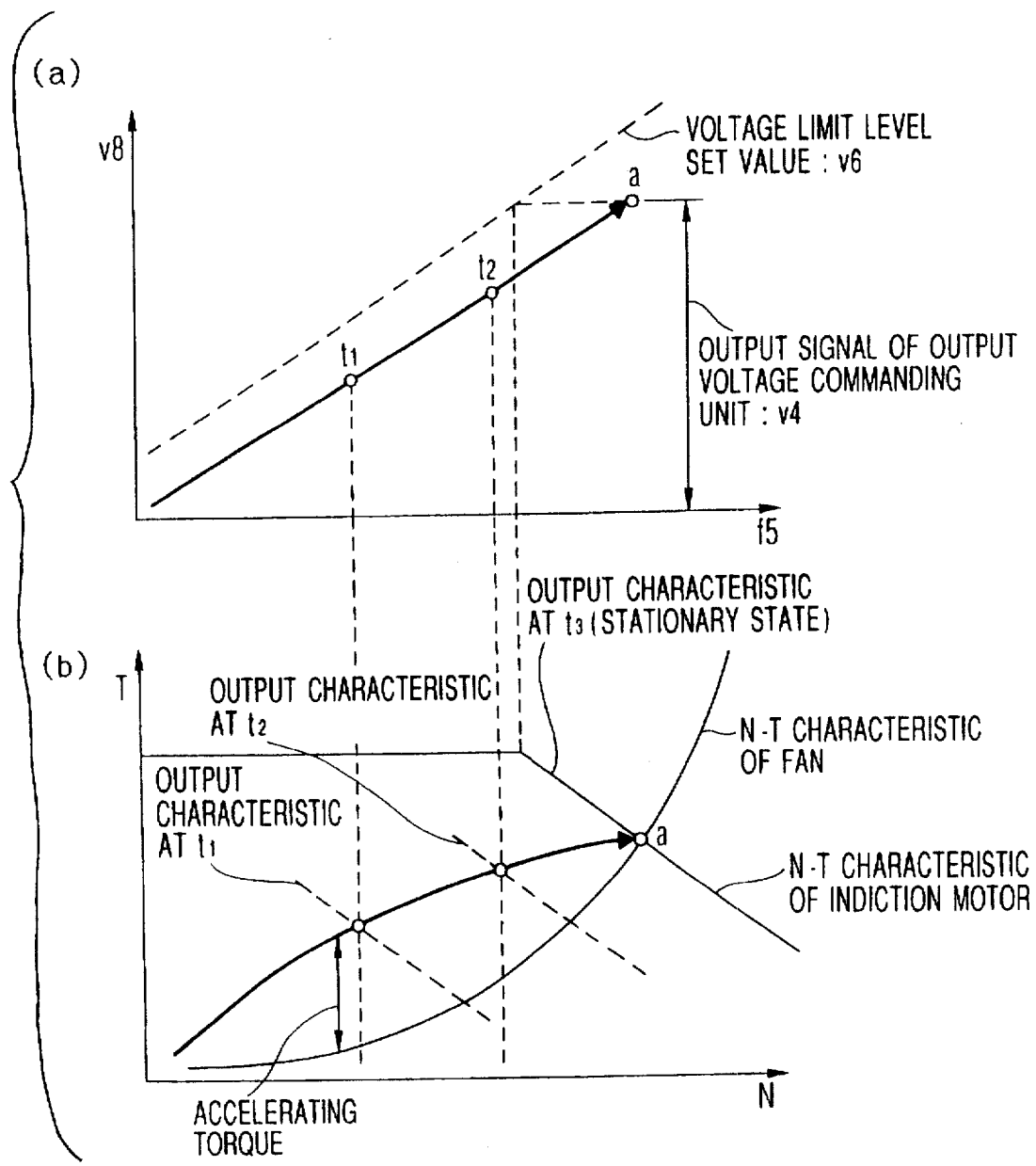
FIG. 7 shows graphs (a) and (b) for explaining the operation in the first embodiment of the invention.

When a desired voltage command value is applied to the output voltage commanding unit 4 while the induction motor is in stop condition, the output signal v6 of the voltage limit level setting unit 6 coincides, at the beginning, with the output of the voltage limiter unit 7 by the action of the voltage limit level setting unit 6 and voltage limiter unit 7 as described previously; but the output signal v6 as it is does not serves as the output voltage command signal for the inverter circuit 3 and the output signal v8, that is, the output voltage command signal for the inverter circuit 3 gradually increases by the action of the voltage slow-up unit 8. The output signal v8 of the voltage slow-up unit 8 continues to increase toward a target which is a level of the output signal v6 of voltage limit level setting unit 6 now serving as the input signal to the unit 8. But the rotation speed of the induction motor 1 increases an so the level of the signal v6 also increases. The rate of increase of the rotation speed, that is, the rotational acceleration of the induction motor 1 is substantially determined by a value obtained by dividing accelerating torque of the induction motor 1 by inertial moment of the induction motor 1 and fan 15. When the output signal v8 of the voltage slow-up unit 8 is so preset as to sufficiently gradually increase by taking the above into account, the output signal v8 can trace a path indicated by arrow in FIG. 7 to reach the point a without taking the level of the output signal v6 of the voltage limit level setting unit 6. In FIG. 7, t1, t2 and t3 represent times corresponding to t1, t2 and t3 at a lower illustration (b) in FIG. 6.

To sum up, the more gradual the increase of the output signal v8 of the voltage slow-up unit 8, the more the path of the output characteristic of the induction motor 1 in the transient state preceding the point a approaches from the output characteristic in the stationary state to the load characteristic of the fan 15. Therefore, by adjusting the rise time tup of the voltage slow-up unit 8, the accelerating torque can be optimized.

Accordingly, by virtue of the provision of the voltage slow-up unit 8, the accelerating torque can be prevented from becoming unnecessarily large and can assume a suitable value and besides, even when the voltage limit level is set discontinuously, the output voltage command signal for the inverter circuit 3 can be increased continuously and vibration and noise can therefore be reduced during starting.

In the present embodiment, the voltage slow-up unit 8 is interposed between the voltage limiter unit 7 and the inverter circuit 3 but it may be interposed between the output voltage commanding unit 4 and the voltage limiter unit 7. In this alternative, however, when the induction motor 1 suffers a counter wind for a long time and thereafter the counter wind calms down to cause the rotation speed to increase up to a value at the normal load point, the output signal of the voltage slow-up unit 8 coincides with the output signal v4 of the output voltage commanding unit 4 as the time elapses and the effect of the voltage slow-up unit 8 cannot fulfil itself. In contrast thereto, by disposing the voltage slow-up unit 8 after the voltage limiter unit 7 as in the case of the present embodiment, the effect of the voltage slow-up unit 8 can fulfil itself under the same condition as above and smooth recovery to the point a can be ensured.

The output signal v8 of the voltage slow-up unit 8 is not always required to be linear as shown in FIG. 6 but may be of a desired curve, a combination of straight lines of different inclinations or a combination of a curve and a straight line.

As described above, according to the present embodiment, thanks to the provision of the voltage limit level setting unit 6 and voltage limiter unit 7, the increased of driving current can be suppressed even when the induction motor 1 is driven externally forcibly by a strong wind (counter wind) such a storm, thereby ensuring that breakdown of the induction motor 1 and inverter circuit 3 due to an overcurrent can be prevented and small-sized elements of small power capacity can be used as power semiconductor parts constituting the inverter circuit 3.

Further, since the slip frequency is always controlled to a suitable positive value, no regenerative power is generated even when the induction motor 1 receives a tail wind and the induction motor 1 can be driven highly efficiently.

Further, by virtue of the provision of the voltage slow-up unit 8, the accelerating torque can be set to a suitable value which is not unnecessarily large and the output voltage command signal for the inverter circuit 3 can be increased smoothly, so that vibration and noise can be reduced during acceleration of the induction motor 1.

In the present embodiment, the voltage limit level setting unit 6 is constructed as receiving the output signal f5 of the output frequency commanding unit 5 but it may receive the output signal f2 of speed detecting unit 2 which is not added with the slip frequency f51 to thereby attain similar effects.

(Embodiment 2)

A second embodiment of the present invention will now be described with reference to the accompanying drawings.

Figure 8:
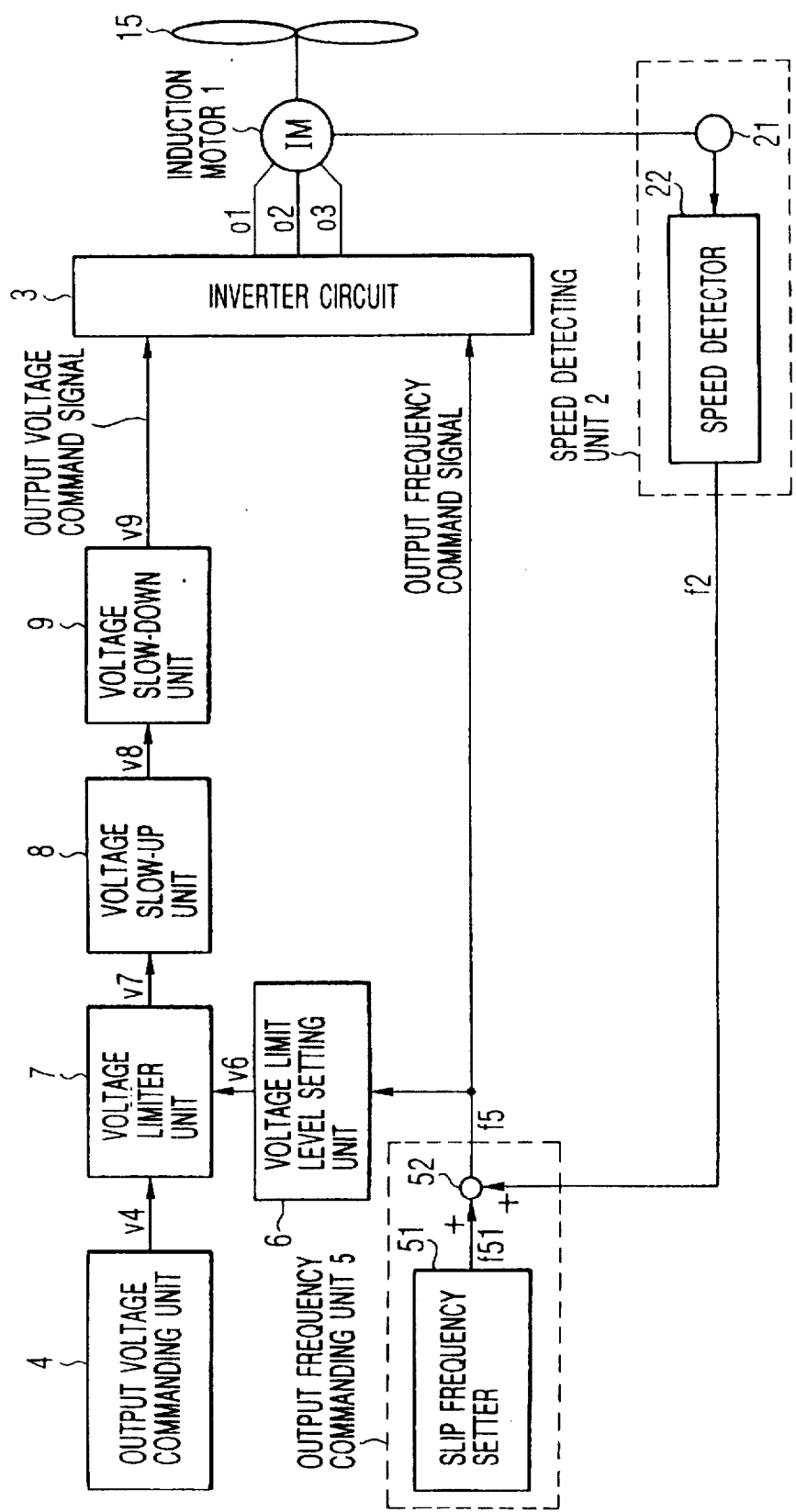
FIG. 8 is a block diagram showing a driving apparatus of an induction motor according to a second embodiment of the present invention.

FIG. 8 shows a driving apparatus of an induction motor according to the second embodiment of the present invention. Referring to FIG. 8, a voltage slow-down unit 9 is adapted to receive, as an input signal, an output signal v8 of the voltage slow-up unit 8 and process the input signal as will be described later to provide an output signal v9 which is delivered, as an output voltage command signal, to the inverter circuit 3. Excepting the voltage slow-down unit 9, the second embodiment is identical to the first embodiment shown in FIG. 1, and components having the same function as those of the first embodiment are designated by like reference numerals and will not be described herein.

The operation of the second embodiment of the induction motor driving apparatus constructed as above will be described.

In the previously described first embodiment, a problem as below is encountered when the rotation speed shifts from high to low. The rotation speed of the induction motor 1 can be shifted from high to low by decreasing the value or level of the output signal v4 of the output voltage commanding unit 4. At that time, with the value of the output signal v4 decreased rapidly, the output voltage command signal to be inputted to the inverter circuit 3 is responsively decreased abruptly and voltage applied to the induction motor 1 is decreased rapidly.

Figure 9:
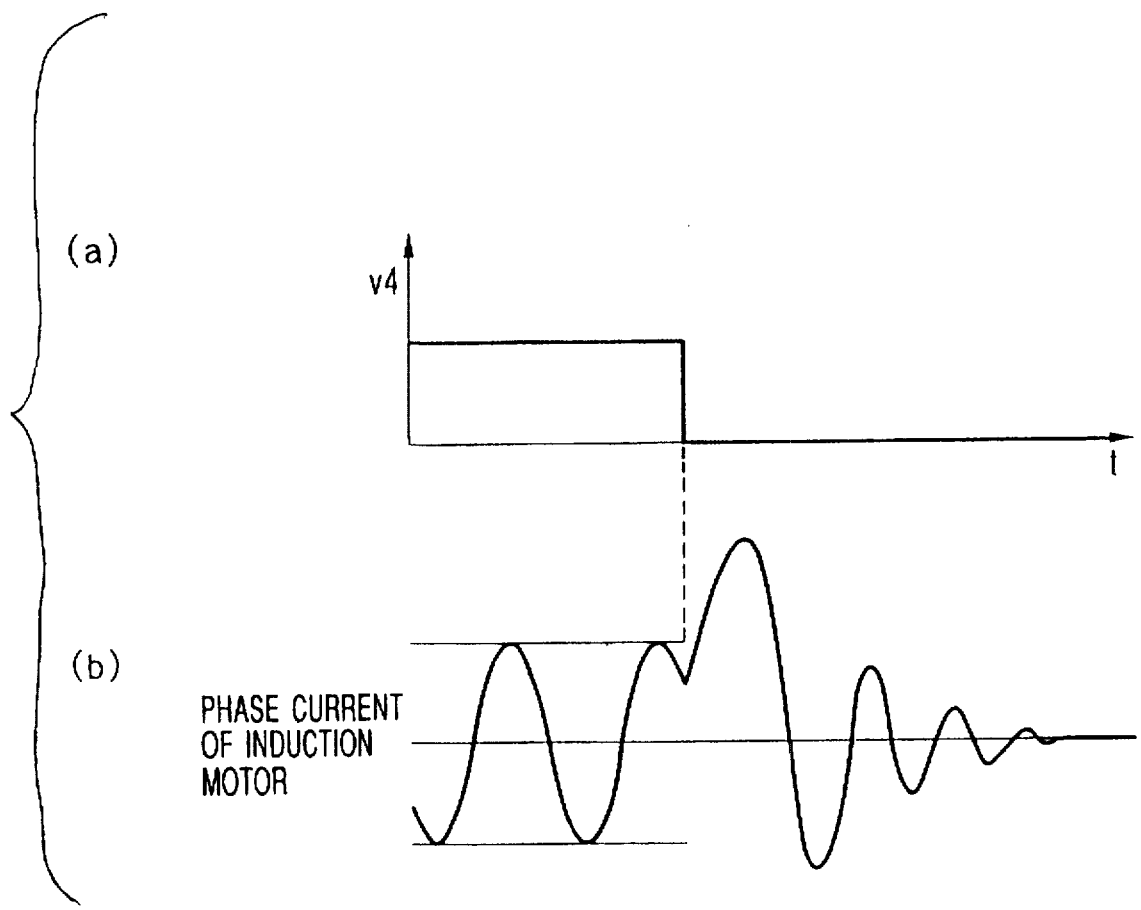
FIG. 9 is a time chart for explaining in parts (a) and (b) the operation in the second embodiment of the invention.

When the amount of a decrease in voltage at that time is large and voltage induced in the induction motor 1 before the occurrence of the decrease in voltage is high, the induced voltage does not attenuate immediately, with the result that induced voltage remaining temporarily in the induction motor 1 sometimes exceeds the input voltage and this induced voltage causes an overcurrent to flow. In such an event, there is a possibility that the inverter circuit 3 will be broken down by the overcurrent. FIGS. 9(a) and (b) shows the behavior in this event, depicting a phase current of the induction motor 1 when the value of the output signal v4 of the output voltage commanding unit 4 falls to 0 (zero).

To eliminate the disadvantage as above, the voltage slow-down unit 9 is provided in the present embodiment.

FIGS. 10(a) and (b) shows the operation of the voltage slow-down unit 9, depicting how the input signal v8 and the output signal v9 change with time t on abscissa. In operation, as shown in FIG. 10, the voltage slow-down unit 9 receives the output signal v8 of the voltage slow-up unit 8 and upon fall of the signal v8, it gradually decreases its output signal v9 with the lapse of time to the same level as that of its input signal v8 in accordance with a preset rate. Fall time tdown required for the output signal v9 to reach the same level as that of the input signal v8 takes a value of, for example, several of 10 ms to several of 10 s when voltage changes from 0 to a maximum voltage level and typically, a value of several of 100 ms to several of seconds suffices to solve the aforementioned problems.

Accordingly, in the present embodiment constructed as shown in FIG. 8, when the value of the output signal v4 of the output voltage commanding unit 4 is decreased upon shift of the running rotation speed of the induction motor 1 from high to low, this signal is transmitted through the voltage limiter unit 7 and voltage slow-up unit 8 to serve as the input signal v8 to the voltage slow-down unit 9. Then, by the aforementioned action of the voltage slow-down unit 9, the output signal v9, that is, the output voltage command signal for the inverter circuit 3 is decreased gradually in accordance with the preset fall time and the input voltage to the induction motor 1 is also decreased gradually.

Structurally, in the present embodiment, the slip frequency is always controlled to a positive value and therefore, the induced voltage is smaller than the voltage inputted to the induction motor 1 in the stationary state and the difference voltage acts as a voltage which actually operates the induction motor 1. Accordingly, if the input voltage is decreased within the range in which the input voltage does not fall below the induced voltage under the stationary condition, then the aforementioned disadvantage will not take place. As the input voltage decreases, the induced voltage also decreases gradually. Thus, by repeating this operation when the input voltage decreases, that is, by taking advantage of the construction of the present embodiment in which the input voltage is decreased gradually, the aforementioned problems can be avoided. In this case, the rate of decrease of the voltage at that time is determined by an attenuation characteristic of voltage induced in the induction motor 1 and by spending, for example, several of 100 ms to several of seconds for decreasing the voltage from AC 200V to 0V, the aforementioned disadvantage can be avoided.

As described above, according to the present embodiment, thanks to the provision of the voltage slow-down unit 9, the output voltage command signal for the inverter circuit 3 can be decreased gradually even when the value of the output signal v4 of the output voltage commanding unit 4 is decreased rapidly and it takes a longer time than the attenuation time of the induced voltage for the input voltage to the induction motor 1 to decrease gradually. Accordingly, the remaining induced voltage will not exceed the input voltage to prevent an overcurrent from flowing transiently and the inverter circuit 3 can be operated safely.

By broadening the setting range of the rise time tup of the output signal v8 of the voltage slow-up unit 8 and the setting range of the fall time tdown of the output signal v9 of the slow-down unit 9 and in addition, by changing the setting range desirably during operation of the induction motor 1, there can be obtained such a new effect that a speed change pattern of high degree of freedom which is highly changeable without relying upon a large change in the output signal v4 of the output voltage commanding unit 4 can be prepared.

In the present embodiment, the voltage slow-down unit 9 is interposed between the voltage slow-up unit 8 and the inverter circuit 3 but it may be interposed between the output voltage commanding unit 4 and the voltage limiter unit 7 or between the voltage limiter unit 7 and the voltage slow-up unit 8.

The fall pattern of the output signal v9 of the voltage slow-down unit 9 is not always required to be linear as shown in FIGS. 10(a) and (b) but may be of a desired curve, a combination of straight lines of different inclinations or a combination of a curve and a straight line.

(Embodiment 3)

A third embodiment of the present invention will now be described with reference to the accompanying drawings.

Figure 11:
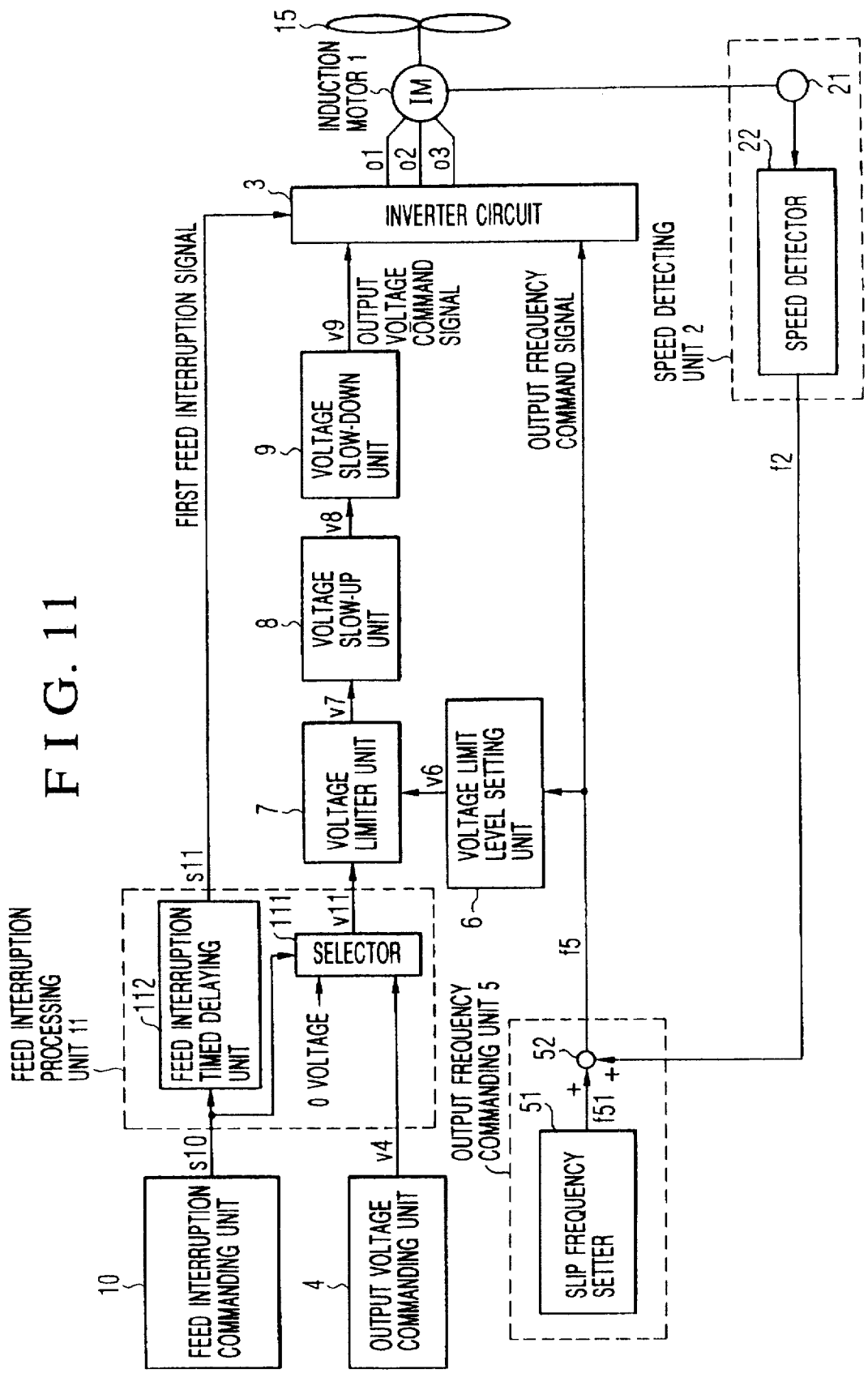
FIG. 11 is a block diagram showing a driving apparatus of an induction motor according to a third embodiment of the present invention.

FIG. 11 shows a driving apparatus of an induction motor according to the third embodiment of the present invention. Referring to FIG. 11, a feed interruption commanding unit 10 is adapted to generate a command for either feeding or interrupting power to the induction motor 1 and an output signal s10 taking a binary value indicative of either feeding or feed interruption is applied to a feed interruption processing unit 11.

The feed interruption processing unit 11 is comprised of a selector 111 and a feed interruption timed delaying unit 112. The selector 111 selects 0 or an input signal v4 in accordance with a signal value of the input signal s10 and delivers a selected signal. When the input signal s10 has a level for commanding feed interruption, an output signal v11 is 0 and when the input signal s10 has a level for commanding feeding, the output signal v11 has the same level as the input signal v4. When the input signal s10 changes from the level for commanding feeding to the level for commanding feed interruption, the feed interruption timed delaying unit 112 changes its output signal s11 from the level for commanding feeding to the level for commanding feed interruption after the lapse of preset time and conversely when the input signal s10 changes from the level for commanding feed interruption to the level for commanding feeding, it changes its output signal s11 from the level for feed interruption to the level for feeding at the same timing.

The output signal s11 of the feed interruption processing unit 11 is transmitted, as a first feed interruption signal, to the inverter circuit 3 and the output signal v11 is transmitted, as a voltage command signal, to the voltage limiter unit 7.

The remaining components are identical to those of the second embodiment shown in FIG. 8, and components having the same function as those of the second embodiment are designated by like reference numerals and will not be described herein.

The operation of the induction motor driving apparatus constructed as above will be described.

In the previously described second embodiment, when the feeding state shifts to the feed interruption state to stop the induction motor 1, current flowing through the induction motor 1 stops abruptly. Consequently, vibration and noise are sometimes generated temporarily depending on the state of the mechanical system and this makes a matter in an application to an air conditioner which is installed indoors in a hospital or a library and is strongly required to operate calmly. To cope with this problem, the feed interruption processing unit 11 is provided in the present embodiment.

The operation of the present embodiment will be described with reference to a time chart of FIG. 12. For simplification of description, it is now assumed that in the initial state, the output signal v4 of the output voltage commanding unit 4 has a smaller level than that of the output signal v6 of the voltage limit level setting unit 6.

Figure 12:
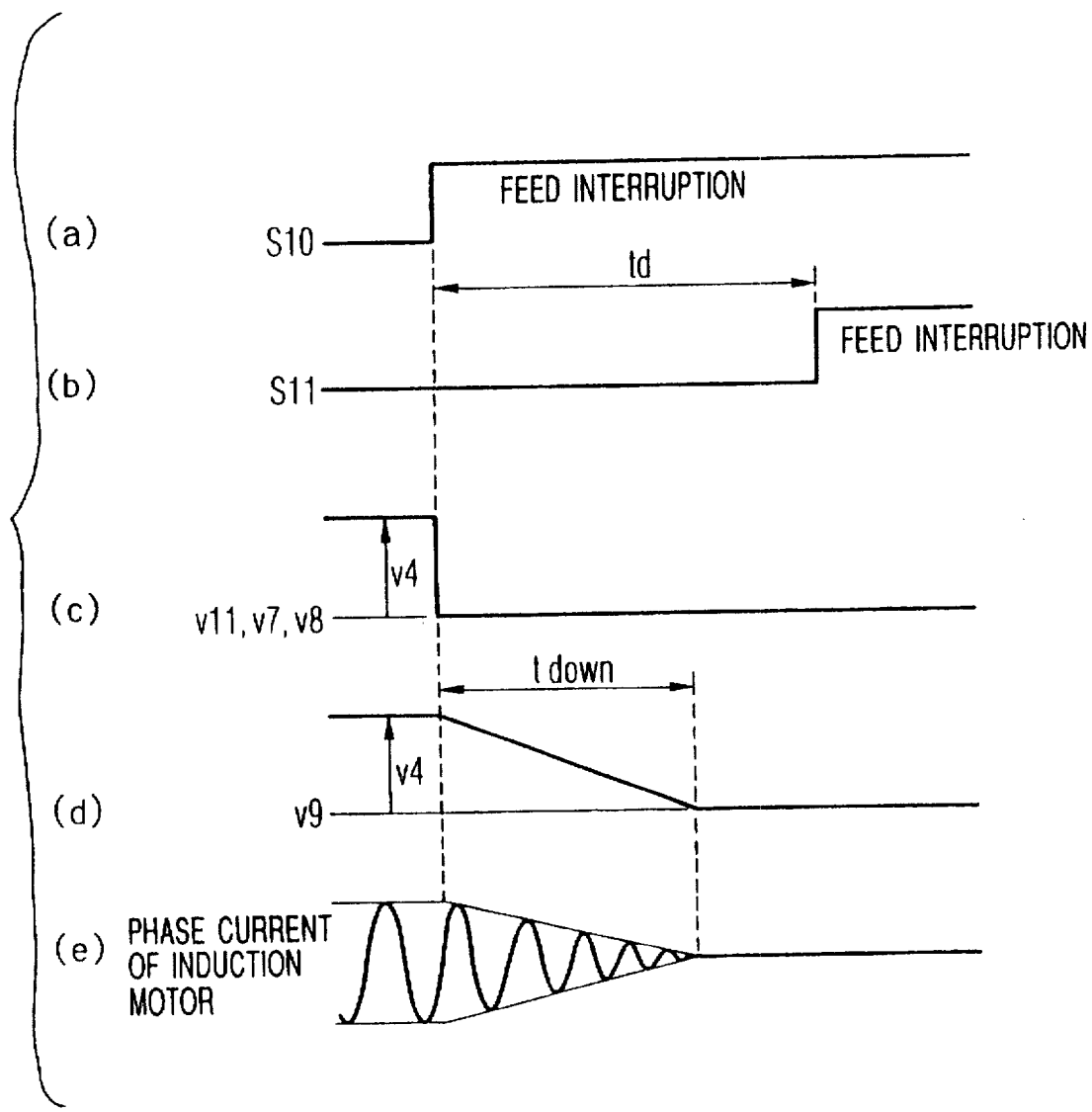
FIG. 12 is a time chart for explaining in parts (a)–(e) the operation in the third embodiment of the invention.

When the output signal s10 of the feed interruption commanding unit 10 is changed from the level for commanding feeding to the level for commanding feed interruption ((a) of FIG. 12), the feed interruption timed delaying unit 112 operates to change its output signal s11 from the level for commanding feeding to the level for commanding feed interruption at the termination of preset delay time td ((b) of FIG. 12). With the signal s10 changed from the level for commanding feeding to the level for commanding feed interruption, the selector 111 operates to change its output signal v11 from the level of the signal v4 to 0 ((c) of FIG. 12). This output signal v11 is sequentially transmitted to the voltage limiter unit 7 and the voltage slow-up unit 8 and finally serves as the input signal v8 to the voltage slow-down unit 9. As a result, while the level of the signal v8 decreases rapidly from the level of the signal v4 to 0, the voltage slow-down unit 9 operates to deliver its output signal v9 which decreases gradually within preset time tdown ((d) of FIG. 12). Responsively thereto, the voltage peak value of the output voltage of phases o1, o2 and o3 of the inverter circuit 3 decreases gradually and similarly, current of the induction motor 1 also decreases gradually ((e) of FIG. 12). Since the set delay time td of the feed interruption timed delaying unit 112 is set to be longer than the set time tdown of the voltage slow-down unit 9, feeding can be interrupted after the gradually decreasing current of the induction motor 1 falls to 0 and so vibration and noise can be suppressed to very small levels during stopping.

Even when the output signal v4 of the output voltage commanding unit 4 is larger in level than the output signal v6 of the voltage limit level setting unit 6 under the initial condition, the same operation as above proceeds with the only exception that before start of decreasing, the signal v9 assumes the level of signal v6 instead of the level of signal v4.

As described above, according to the present embodiment, by virtue of the provision of the feed interruption processing unit 11 and by the action of the voltage slow-down unit 9, the output voltage command signal decreases gradually to 0 when the feed state shifts to the feed interruption state and feeding can be interrupted after the current of the induction motor 1 is stopped. Accordingly, abrupt interruption of the current passing through the induction motor 1 can be prevented and vibration and noise can be inverter circuit 3 to rise in temperature to substantially the same value is set in accordance with the value of the output frequency command signal, and a load which generates load torque equal to output torque of induction motor 1 at that time is considered as a reference load.

A load level detecting unit 13 receives the output signal v12 of the reference load timed voltage level setting unit 12 and the signal v7 standing for the output voltage command signal for the inverter circuit 3 and calculates a ratio of the value of signal v7 to the value of signal v12 to provide an output signal i13. For example, the output signal i13 is prepared from a result of division of the value of signal v7 by the value of signal v12.

Figure 14:
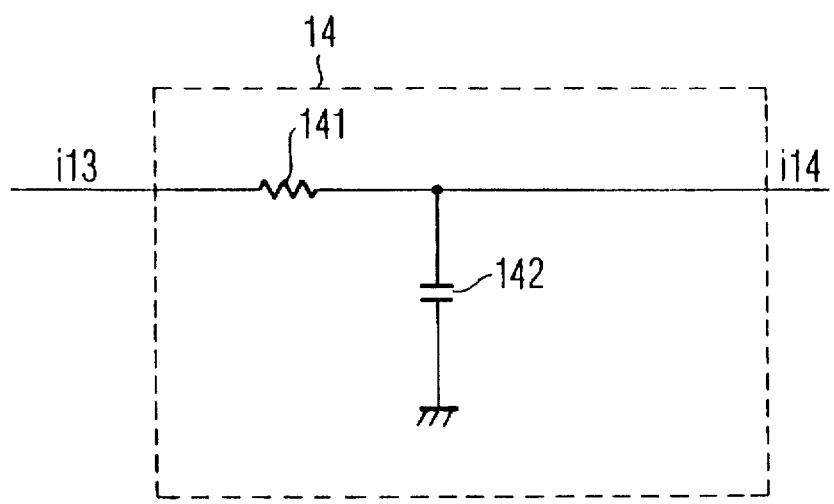
FIG. 14 is a circuit diagram showing an example of construction of a low-pass filter in the fourth embodiment of the invention.

A low-pass filter 14 eliminates high frequency components of the input signal i13 to provide an output signal i14. The low-pass filter 14 is so constructed as to perform a linear delay operation by means of, for example, a resistor 141 and a capacitor 142 as shown in FIG. 14.

An overload detecting unit 16 is comprised of a comparator 161 and an allowable maximum load level setting unit 162 and it compares the value of an output signal i162 of the allowable maximum load setting unit 162 with the value of the output signal i14 of the low-pass filter 14 to set its output signal s16 to the level for commanding feed interruption when the signal suppressed to very small levels during stopping.

In the present embodiment, the set delay time td of the feed interruption timed delaying unit 112 is set to be longer than the set time tdown of the voltage slow-down unit 9 in order that feeding can be interrupted after the current of the induction motor 1 is stopped steadily. Accordingly, the set time tdown and the set delay time td may otherwise have the same value or depending on the degree of necessity for decreasing vibration and noise, the set delay time td may be slightly shorter than the set time tdown.

(Embodiment 4)

A fourth embodiment of the present invention will now be described with reference to the accompanying drawings.

Figure 13:
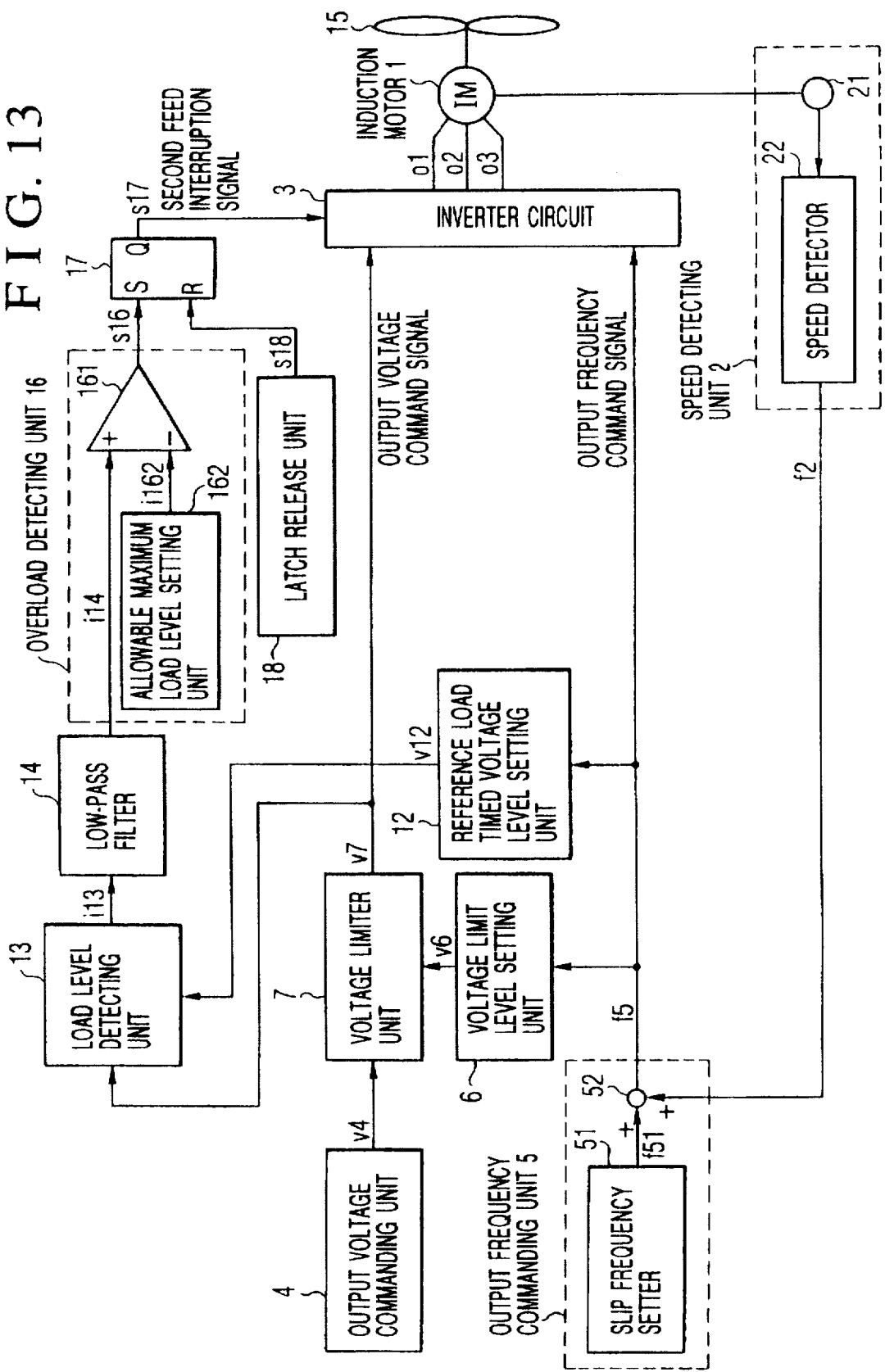
FIG. 13 is a block diagram showing a driving apparatus of an induction motor according to a fourth embodiment of the present invention.

FIG. 13 shows a driving apparatus of an induction motor according to the fourth embodiment of the present invention. Referring to FIG. 13, a reference load timed voltage level setting unit 12 operates in accordance with a preset pattern to decrease its output signal v12 as the signal f5 standing for the output frequency command signal for the inverter circuit 3 decreases and conversely, to increase its output signal v12 as the input signal f5 increases. In the pattern for increase or decrease of the output signal v12, the value of output voltage command signal for causing the induction motor 1 or the i14 becomes larger.

A latch unit 17 receives the output signal s16 of the overload detecting unit 16 to set its output signal s17 when the signal s16 has the level for commanding feed interruption. The latch unit 17 is reset by an output signal s18 of a latch release unit 18. The output signal s17 of the latch unit 17 is transmitted, as a second feed interruption signal, to the inverter circuit 3 and when the latch unit 17 is placed in set condition, the inverter circuit 3 is brought into the feed interruption state.

Excepting the above, the fourth embodiment is identical to the first embodiment shown in FIG. 1, and components having the same function as those of the first embodiment are designated by like reference numerals and will not be described herein. The voltage slow-up unit 8 is not indispensable for the present embodiment and is therefore removed from FIG. 13.

The operation of the fourth embodiment of the induction motor driving apparatus constructed as above will be described.

In the first embodiment, the voltage limit level setting unit 6 and voltage limiter unit 7 cooperate to prevent an overcurrent from flowing through the induction motor 1 and inverter circuit 3, thus preventing them from being broken down. But even when the level of current is not so high as to bring about the breakage, temperature rises to sometimes lead to breakdown due to heat if an overload is applied for a long time and a large current flows continually in such an event that, for example, the output shaft of the induction motor 1 or the fan 15 is tangled with some foreign matter. To prevent this problem, the set level of the voltage limit level setting unit 6, that is, the value of signal v6 may be reduced to restrict the current to thereby prevent the temperature from rising to above a constant value even when an overload is applied for a long time. But this expedient necessarily decreases the output torque of the induction motor 1 and in many applications, demanded specifications cannot be satisfied. It is infrequent that a strong counter wind continues to blow against the fan 15 for a long time under the normal operation condition, and a kind of abnormal state as above is desired to be detected to interrupt power conduction for the purpose of protection. Thus, the construction of the present embodiment is employed for detection of the overload state.

Figure 15:
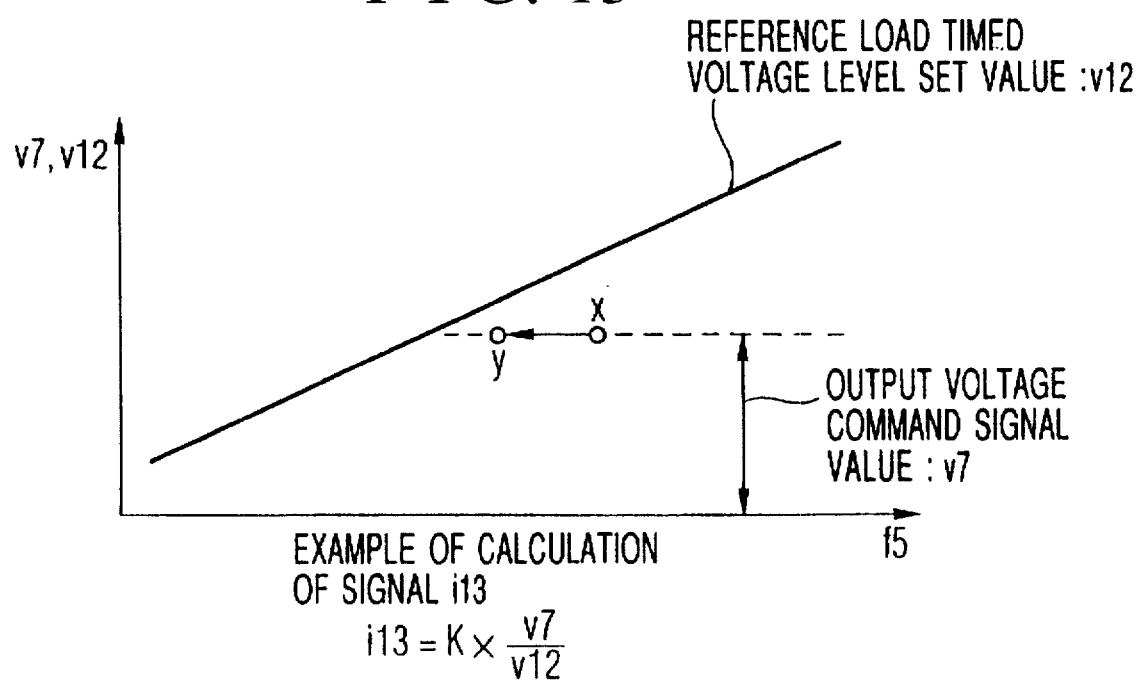
FIG. 15 is a graph for explaining the operation in the fourth embodiment of the invention.

FIG. 15 shows how the reference load timed voltage level setting unit 12 and load level detecting unit 13 operate, where abscissa represents the output frequency command signal f5 and ordinate the output signal v12 of the reference load timed voltage level setting unit and the output voltage command signal v7.

Referring to FIG. 15, when the output frequency command signal f5 for the inverter circuit 3 changes, the reference load timed voltage level setting unit 12 responds to this change to change its output signal v12 in accordance with the preset pattern. This pattern is exemplified as linear in FIG. 15 but essentially, it is determined by setting the value of output voltage command signal for causing the induction motor 1 or inverter circuit 3 to rise in temperature to substantially the same value, in accordance with the value of the output frequency command signal and in some cases, it may take the form of a curve or a straight line having discontinuous points. In other words, the pattern indicates a value of the output voltage command signal which prevails when the reference load for making the temperature rise value substantially constant regardless of the rotation speed is applied to the induction motor 1, by using the output frequency command signal as a parameter. Accordingly, when the output voltage command signal inputted to the inverter circuit 3 takes a value on this line, it is implied that a load equal to the reference load is imposed on the induction motor 1 and at that time, the temperature rise in the induction motor 1 or the inverter circuit 3 takes a value which is substantially constant regardless of the output frequency.

The load level detecting unit 13 performs calculation on the basis of a ratio of the signal v7 standing for the output voltage command signal inputted to the inverter circuit 3 to the signal v12 standing for a reference load timed voltage level set value so as to estimate a load which is ratioed to the reference load. More particularly, by performing calculation based on the relation between the value of the signal v7 standing for the output voltage command signal and the temperature rise in the induction motor 1 and inverter circuit 3 when the value of the signal f5 standing for the output frequency command signal remains unchanged, the load which is ratioed to the reference load can be detected.

More specifically, when the temperature rise value of the induction motor 1 or the inverter circuit 3 increases, for example, in proportion to the value of the signal v7 standing for the output voltage command signal when the value of the signal f5 standing for the output frequency command signal remains unchanged, the ratio of the present load to the reference load can be determined by dividing the level of signal v7 by the level of signal v12.

Further, when the temperature rise value of the induction motor 1 or the inverter circuit 3 increases, for example, in proportion to the square of the value of the signal v7 standing for the output voltage command signal, the ratio of the present load to the reference load can be determined by dividing the level of signal v7 by the level of signal v12 and squaring a result of the division.

By multiplying the thus obtained ratio of the present load to the reference load by a coefficient for matching the unit and the dimension or by multiplying the signal v7 by the coefficient in advance before the calculation for determining the aforementioned ratio of the present load to the reference load is carried out, the present load level can be calculated to provide the output signal i13.

The operation when the load torque increases will be described with reference to FIG. 15. When the load torque increases under the initial condition at point x, the rotation speed decreases and so the output frequency command signal f5 decreases to cause the operating point to move to a point y. At that time, since the value of the signal v7 remains unchanged, the ratio of the signal v7 to the signal v12 becomes higher at the point y than at the point x and consequently, the output signal i13 of the load level detecting unit 13 increases. Namely, an increase in the load torque is detected.

The low-pass filter 14 eliminates high frequency components of the output signal i13 of the load level detecting unit 13 to provide the output signal i14. The filter has a time constant which is set on the basis of a thermal time constant of the inverter circuit 3 or the induction motor 1. Accordingly, when the value of the signal i13 is increased by a temporary overload which does not greatly affect the rise of temperature, the value of the output signal i14 hardly changes. In addition, a noise superimposed on the input signal i13 can also be removed. In this manner, unnecessary detection of overload can be prevented.

The overload detecting unit 16 compares the allowable maximum load level i162 preset in the allowable maximum load level setting unit 162 with the value of the output signal i14 of the low-pass filter 14 and sets the output signal s16 to the level for commanding feed interruption when the signal i14 is larger, that is, an overload exceeding the allowable level is applied.

When the output signal s16 of the overload detecting unit 16 assumes the level for commanding feed interruption, the latch unit 17 is set to deliver a signal which is transmitted to the inverter circuit 3 to place it in feed interruption condition. When once set, the latch unit 17 keeps being set unless the latch release unit 18 resets the latch unit and so the feed interruption state is kept.

Figure 16:
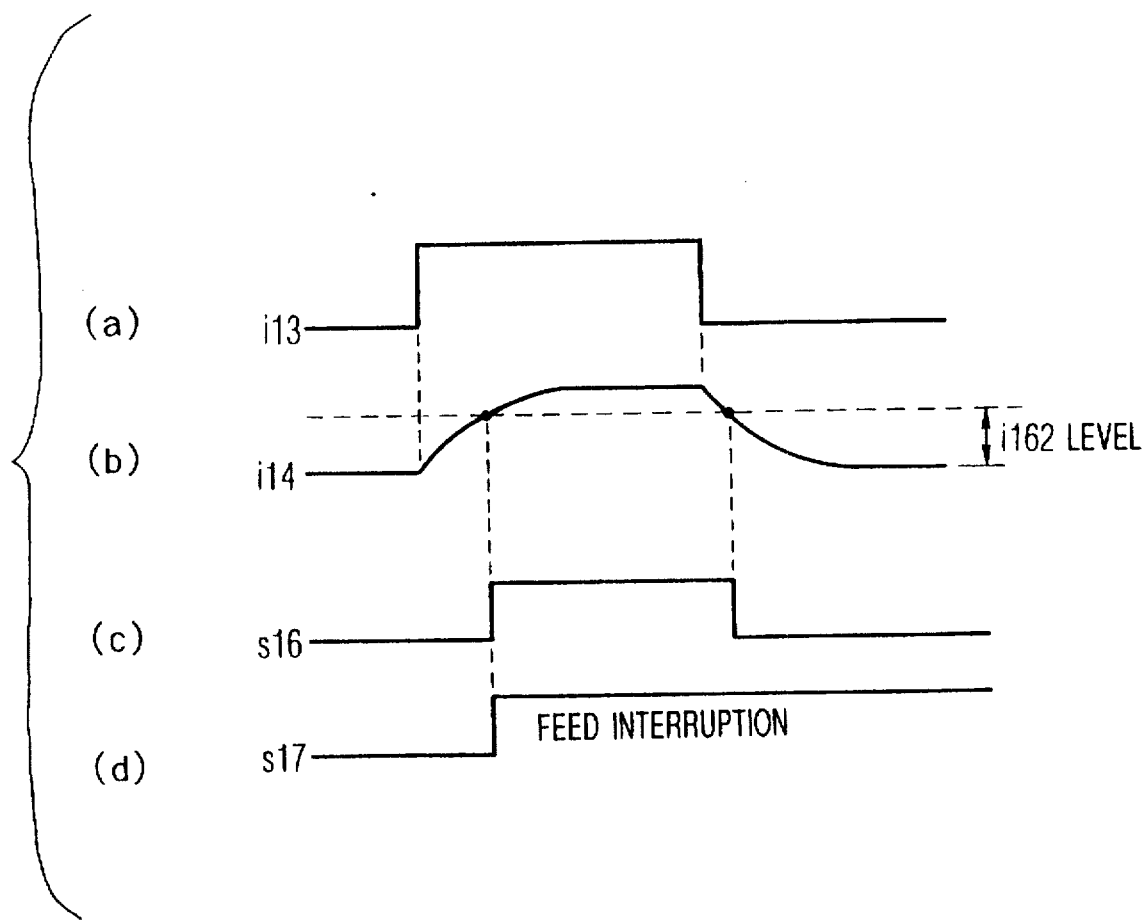
FIG. 16 is a time chart for explaining in parts (a)–(d) the operation in the fourth embodiment of the invention.

An example of operation when the output signal i13 of the load level detecting unit 13 changes stepwise is shown in a time chart of FIG. 16.

As described above, according to the present embodiment, the load level detecting unit 13 detects a load level from the output voltage command signal for the inverter circuit 3 on the basis of the set value v12 of the reference load timed voltage level setting unit 12, components of the detected load level signal i13 ((a) of FIG. 16) which affect the temperature rise is extracted by the low-pass filter 14 to provide a signal i14 ((b) of FIG. 16) and when the signal i14 exceeds the allowable maximum load level, the feed interruption processing is carried out, so that even when an overload is applied for a long time, breakdown of the inverter circuit 3 and induction motor 1 due to heat can be prevented.

In contrast to the construction of the present embodiment, the conventional construction widely used for detecting the phase current of the induction motor 1 with a current detector and providing its effective value as a load level must use the current detector which is relatively expensive. In addition, by reason even with the current value fixed, the amount of wind decreases to degrade the cooling effect as the rotation number decreases, heat generation in the induction motor 1 tends to increase and therefore, the level for detection of an overload is inevitably set to one matching the low speed region, raising a problem that flow of sufficient driving current is not allowed and sufficient torque cannot be obtained in the high speed region. The construction of the present embodiment dispensing with the current detector can be realized at low costs and in this construction, the set value of the reference load timed voltage level setting unit 12 can be set desirably on the basis of an actual value of temperature rise of the induction motor 1 in accordance with the output frequency command signal f5 which shifts responsively to the rotation number and hence sufficient output torque can be obtained in the high speed region and the induction motor 1 can be protected steadily from heat generation even in the low speed region.

Further, since the set value of the reference load timed voltage level setting unit 12 exhibits a characteristic which is similar to that of the set value of the voltage limit level setting unit 6 and in which the output signal increases or decreases in conformity with the increase or decrease of the input signal f5, both the set values can be used in common. In other words, the set value of the voltage limit level setting unit 6 may be preset in consideration of the temperature rise of the inverter circuit 3 or the induction motor 1 in order that the output signal v6 of the voltage limit level setting unit 6 may be used as the input signal v12 to the load level detecting unit 13. In this manner, the reference load timed voltage level setting unit 12 can be dispensed with, thereby simplifying the construction.

The output signal f5 of the output frequency commanding unit 5 is used as the input signal to the reference load timed voltage level setting unit 12 but the output signal f2 of the speed detecting unit 2 may be used as that input signal to attain similar effects.

By combining the construction of the fourth embodiment with that of the previously described embodiment 1, 2 or 3, the effects thereof can newly be added.

(Embodiment 5)

A fifth embodiment of the present invention will now be described with reference to the accompanying drawings.

Figure 17:
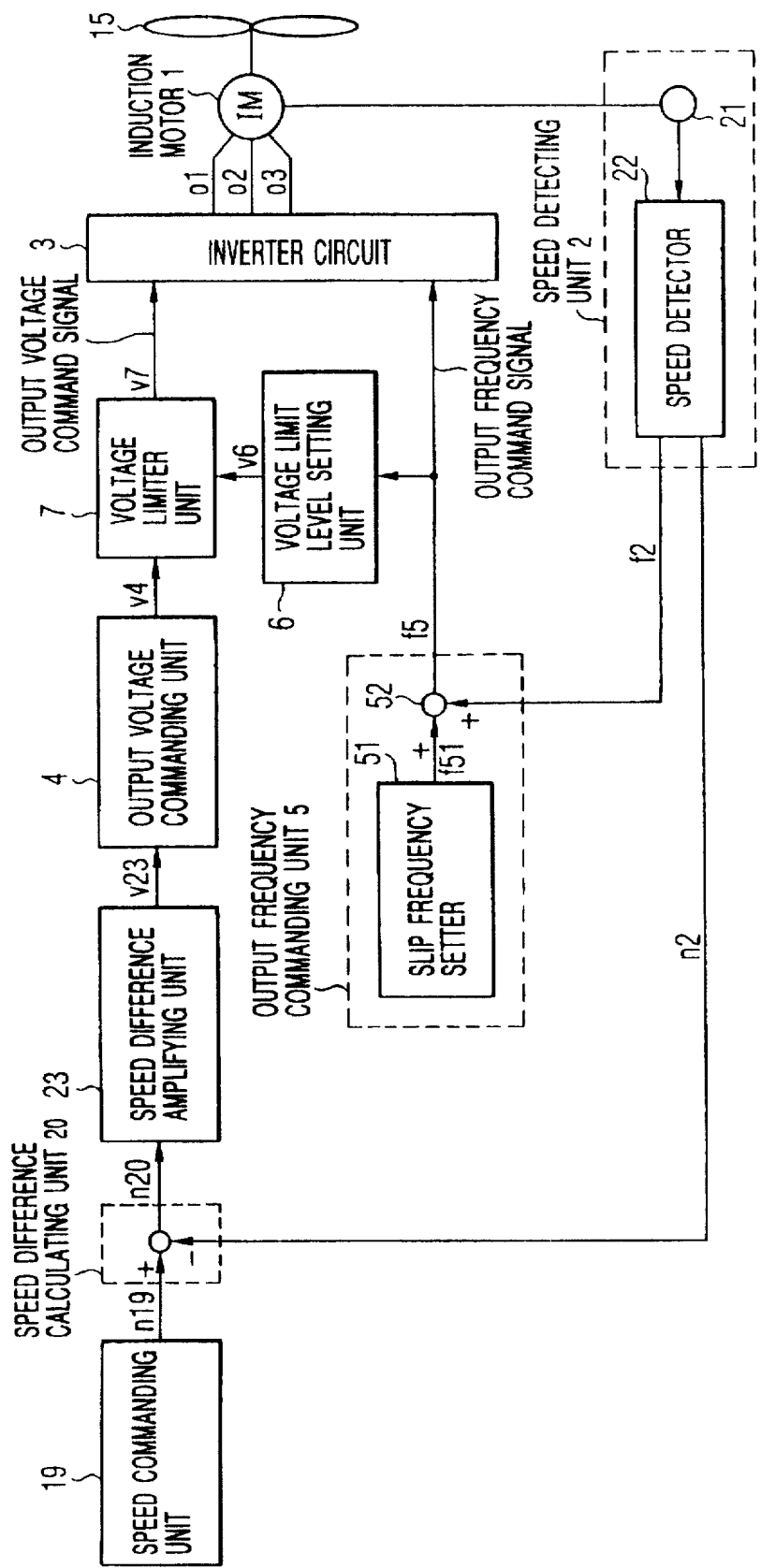
FIG. 17 is a block diagram showing a driving apparatus of an induction motor according to a fifth embodiment of the present invention.

FIG. 17 shows a driving apparatus of an induction motor according to the fifth embodiment of the present invention. Referring to FIG. 17, a speed commanding unit 19 delivers a rotation speed command signal n19 for the induction motor 1, and the rotation speed command signal n19 and a rotation speed signal n2 delivered out of the speed detecting unit 2 are fed to a speed difference calculating unit 20. An output signal n20 of the speed difference calculating unit 20 is transmitted to a speed difference amplifying unit 23 and an output signal v23 of the speed difference amplifying unit 23 is transmitted to the output voltage commanding unit 4.

Figure 18:
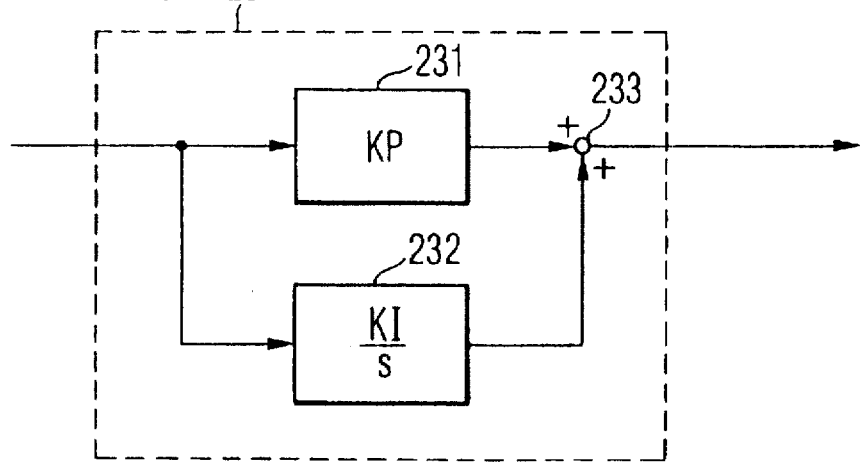
FIG. 18 is a block diagram showing an example of construction of a speed difference amplifying unit in the fifth embodiment of the invention.

As shown in FIG. 18, the speed difference amplifying unit 23 includes a proportional operation unit 231, an integral operation unit 232 and an adder 233 for adding two output signals of the units 231 and 232. In FIG. 18, KP represents a proportional gain, KI an integral gain and s the Laplace operator.

Excepting the above, the fifth embodiment is identical to the first embodiment shown in FIG. 1, and components having the same function as those of the first embodiment are designated by like reference numerals and will not be described herein. The voltage slow-up unit 8 is not indispensable for the present embodiment and is removed from FIG. 17.

The operation of the induction motor driving apparatus constructed as above will be described.

In the first embodiment, the rotation speed of the induction motor 1 is adjusted by changing the output voltage command value applied to the output voltage commanding unit 4 and when external force is applied, for example, a wind blows against the fan 15, load torque is changed to change the rotation speed. Accordingly, the first embodiment cannot be applied to utilization which strongly requires constancy of speed. To keep the rotation speed constant even when the load torque varies, the construction of the present embodiment is employed.

The operation of the present embodiment will be described with reference to FIGS. 17 and 18.

A speed command signal n19 for induction motor 1 delivered out of the speed commanding unit 19 is applied to the speed difference calculating unit 20 and the difference between speed command signal n19 and rotation speed signal n2 delivered out of the speed detecting unit 2 is calculated by the unit 20 to provide an output signal n20. In other words, the signal n20 is obtained by subtracting a signal n2 from the signal n19. The signal n20 is fed to the speed difference amplifying unit 23 and amplified to provide a signal v23 which serves as an output voltage command signal applied to the output voltage commanding unit 4. The output voltage commanding unit 4 transmits this signal v23 as it is therethrough to provide an output signal v4.

Accordingly, when the value of the rotation speed signal n2 is, for example, smaller than the value of the speed command signal n19 indicative of a target rotation speed, that is, when the present speed does not reach the target value, the output voltage command value which becomes higher proportionally to the amount of speed difference is set to the output voltage commanding unit 4 and as a result, the induction motor 1 is accelerated. When the value of the speed command signal n19 equals the value of the speed detection signal n2, that is, the present speed coincides with the target value, the output voltage command value keeps the present level by the action of the integral operation unit 232 of the speed difference amplifying unit 23 and induction motor 1 keeps the present rotation number. When the value of the rotation speed signal n2 is larger than the value of the speed command signal n19, that is, the present speed is higher than the target value, the output voltage command value decreases and the induction motor 1 is decelerated. Accordingly, the output voltage command value applied to the output voltage commanding unit 4 is so adjusted as to always reach the target rotation speed and the rotation speed can therefore be kept to be constant even when the load torque varies.

As described above, according to the present embodiment, the speed difference calculating unit 20 calculates the difference between the target rotation speed and the present rotation speed of the induction motor 1 and the speed difference amplifying unit 23 applies to the output voltage commanding unit 4 the output voltage command value which makes the difference zero, with the result that the rotation speed can be kept to be constant even when the load torque varies.

Figure 19:
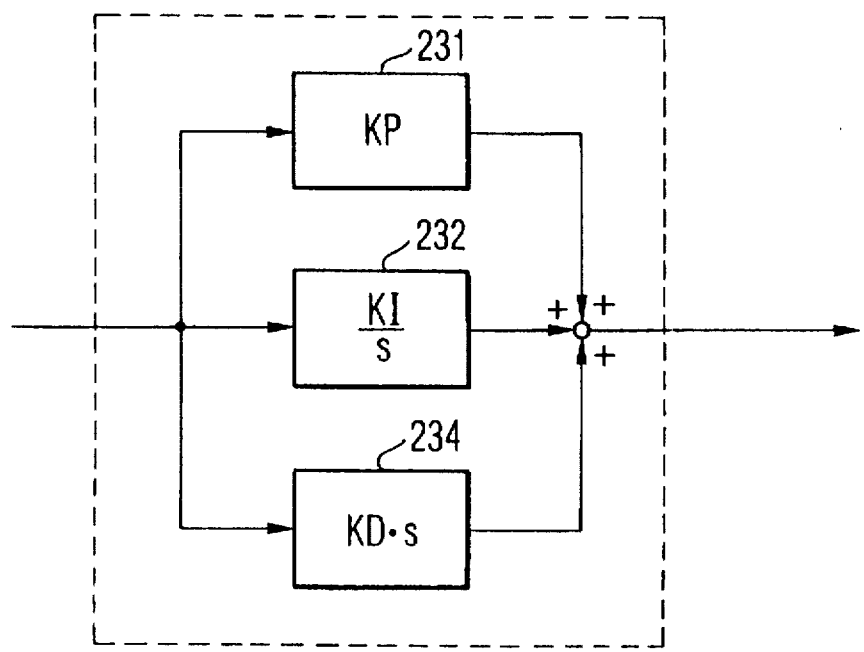
FIG. 19 is a block diagram showing another example of construction of the speed difference amplifying unit in the fifth embodiment of the invention.
Figure 20:
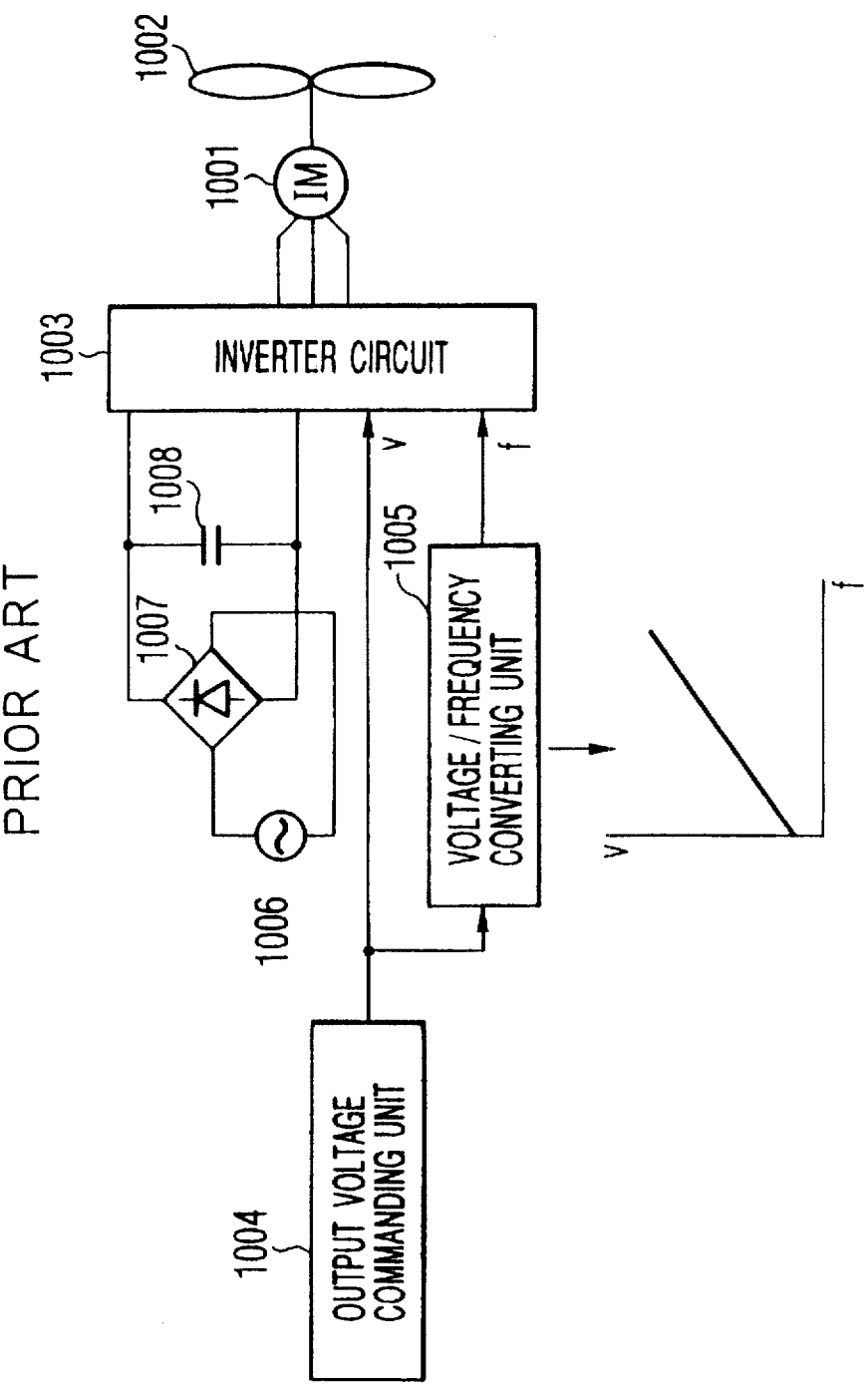
FIG. 20 is a block diagram showing a conventional driving apparatus of an induction motor.

In the present embodiment, the speed difference amplifying unit 23 is comprised of the proportional operation unit 231 and the integral operation unit 232 but a differential operation unit 234 may be added as shown in FIG. 19. Here, KD represents a differential gain. In this manner, the response characteristic of the rotation speed to the speed command can be improved. In some applications, the speed difference amplifying unit 23 may be constructed of only one or two of the proportional operation unit 231, integral operation unit 232 and differential operation unit 234 to satisfy the required constant speed accuracy, thus simplifying the construction.

In the present embodiment, the output signal n19 of the speed commanding unit 19 and the output signal n2 of the speed detecting unit 2 have been described as being a rotation speed signal but they may obviously be a rotation frequency signal.

By combining the construction of the fifth embodiment with that of the previously described embodiment 1, 2, 3 or 4, the effects thereof can newly be added.

As has been described hereinbefore, the present invention has many advantages. In the first place, by providing the voltage limit level setting unit and voltage limiter unit, the driving current can be prevented from increasing even when the induction motor is driven externally forcibly by a strong wind (counter wind) such as a storm, so that the induction motor and inverter circuit can be prevented from being broken down owing to an overcurrent and besides smallsized elements of small power capacity can be used as power semiconductor parts constituting the inverter circuit.

Also, by virtue of the provision of the voltage slow-up unit, the accelerating torque can be set to a suitable value which is not unnecessarily large and besides, the output voltage command signal for the inverter circuit can be increased smoothly to thereby reduce vibration and noise when accelerating the induction motor.

In the second place, thanks to the provision of the voltage slow-down unit, the output voltage command signal for the inverter circuit can be decreased gradually even when the output signal level of the output voltage commanding unit is decreased rapidly, causing the input voltage to the induction motor to decrease gradually by spending a longer time than the attenuation time of voltage induced in the induction motor. Through this, the remaining induced voltage can be prevented from exceeding the input voltage and there occurs no flow of transient overcurrent to ensure safe operation of the inverter circuit.

Thirdly, thanks to the provision of the feed interruption processing unit and voltage slow-down unit, when the feed state shifts to the feed interruption state, the voltage command value decreases gradually to zero and feeding can be interrupted after current flow through the induction motor stops. Accordingly, the current flowing through the induction motor can be prevented from being stopped abruptly and vibration and noise can be suppressed to very small values when stopping.

Fourthly, the load level detecting unit detects a load level from an output voltage command signal for the inverter circuit on the basis of a set value of the reference load timed voltage level setting unit, and the feed interruption processing is carried out when a signal obtained by extracting components of load level signal which affect the rise of temperature and which are detected by means of the lowpass filter exceeds an allowable maximum load level value, so that breakdown of the inverter circuit and induction motor due to heat can be prevented when an overload is applied for a long time.

Also, the set value of the reference load timed voltage level setting unit has a characteristic similar to that of the set value of the voltage limit level setting unit in which the output signal increases or decreases in conformity with the increase or decrease of the input signal and therefore both the set values can be used in common, thus simplifying the construction.

Fifthly, since the speed difference calculating unit calculates the difference between the present rotation speed of the induction motor and the target rotation speed to apply the output voltage command value to the output voltage commanding unit such that the difference becomes zero, the rotation speed can be kept to be constant even when the load torque varies.

In the foregoing embodiments of the present invention, the output of the inverter circuit and the induction motor have been described as being of three phases but they are not always of three phases and may be of a single phase to attain similar effects. For clarity of explanation, part of constituent components of each embodiment are described in terms of hardware but they may obviously be constructed with software.

We claim:

1. A driving apparatus of an induction motor driven under slip frequency control including speed detecting means for detecting a rotation speed of said induction motor, an inverter circuit for feeding an AC voltage to said induction motor on the basis of an output voltage command signal and an output frequency command signal, output voltage commanding means for applying the output voltage command signal to said inverter circuit, and output frequency commanding means for applying to said inverter circuit the output frequency command signal in the form of a frequency signal obtained by adding a predetermined slip frequency to a frequency signal delivered out of said speed detecting means and conforming to the rotation speed of said induction motor, said driving apparatus comprising:

voltage limit level setting means for setting an upper limit value of the output voltage of said inverter circuit in accordance with the output signal of said output frequency commanding means or the output signal of said speed detecting means;

voltage limiter means for restricting the upper limit of the output voltage of said inverter circuit by restricting the output signal of said output voltage commanding means on the basis of a set value of said voltage limit level setting means; and voltage slow-up means for converting the output signal of said output voltage commanding means into a signal which increases at a gradual slope with the lapse of time elapses when that output signal rises and which serves as the output voltage command signal inputted to said inverter circuit.

2. An induction motor driving apparatus according to claim 1 further comprising voltage slow-down means for converting the output signal of said output voltage commanding means into a signal which decreases at a gradual slope with the lapse of time when that output signal falls and which serves as the output voltage command signal inputted to said inverter circuit.

3. An induction motor driving apparatus according to claim 2 further comprising:

- feed interruption commanding means which delivers a command signal for interrupting feeding to said induction motor; and
- feed interruption processing means which sets the output signal value of said output voltage commanding means to 0 when the output signal of said feed interruption commanding means changes from a signal level for commanding feeding to a signal level for commanding feed interruption and which delivers a first feed interruption signal at the termination of the lapse of a predetermined time, whereby when said feed interruption processing means delivers the first feed interruption signal, feeding to said induction motor is interrupted.

4. A driving apparatus of an induction motor driven under slip frequency control including speed detecting means for detecting a rotation speed of said induction motor, an inverter circuit for feeding an AC voltage to said induction motor on the basis of an output voltage command signal and an output frequency command signal, output voltage commanding means for applying the output voltage command signal to said inverter circuit, and output frequency commanding means for applying to said inverter circuit the output frequency command signal in the form of a frequency signal obtained by adding a predetermined slip frequency to a frequency signal delivered out of said speed detecting means and conforming to the rotation speed of said induction motor, said speed detecting means, said driving apparatus comprising:

- voltage limit level setting means for setting an upper limit value of the output voltage of said inverter circuit in accordance with the output signal of said output frequency commanding means or the output signal of said speed detecting means;
- voltage limiter means for restricting the upper limit of the output voltage of said inverter circuit by restricting the output signal of said output voltage commanding means on the basis of a set value of said voltage limit level setting means;
- reference load timed voltage level setting means for setting an output voltage value of said inverter circuit which prevails when a reference load is applied to said induction motor in accordance with the output signal of said output frequency commanding means or the output signal of said speed detecting means;
- load level detecting means for estimating a present load level through calculation based on a ratio of a present output voltage value of said inverter circuit to the set value of said reference load timed voltage level setting means;
- a low-pass filter for removing high frequency components of the output signal of said load level detecting means; and
- overload detecting means for comparing the output signal of said low-pass filter with a preset allowable maximum load level and delivering a second feed interruption signal when that output signal is larger than the allowable maximum load level, whereby when said overload detecting means delivers the second feed interruption signal, feeding to said induction motor is interrupted.

5. A driving apparatus of an induction motor driven under slip frequency control including speed detecting means for detecting a rotation speed of said induction motor, an inverter circuit for feeding an AC voltage to said induction motor on the basis of an output voltage command signal and an output frequency command signal, output voltage commanding means for applying the output voltage command signal to said inverter circuit, and output frequency commanding means for applying to said inverter circuit the output frequency command signal in the form of a frequency signal obtained by adding a predetermined slip frequency to a frequency signal delivered out of said speed detecting means and conforming to the rotation speed of said induction motor, said driving apparatus comprising:

- voltage limit level setting means for setting an upper limit value of the output voltage of said inverter circuit in accordance with the output signal of said output frequency commanding means or the output signal of said speed detecting means;
- voltage limiter means for restricting the upper limit of the output voltage of said inverter circuit by restricting the output signal of said output voltage commanding means on the basis of a set value of said voltage limit level setting means;
- speed commanding means for delivering a rotation speed command signal for said induction motor;
- speed difference calculating means for delivering a speed difference signal obtained by subtracting the rotation speed signal delivered out of said speed detecting means from the rotation speed command signal delivered out of said speed commanding means; and
- speed difference amplifying means for amplifying and processing the speed difference signal delivered out of said speed difference calculating means in the proportional mode, integral mode, differential mode or proportional, integral and differential combined mode and applying a resulting signal to said output voltage commanding means.

* * * * *